US008904885B2

(12) United States Patent
Ikebe et al.

(10) Patent No.: US 8,904,885 B2
(45) Date of Patent: Dec. 9, 2014

(54) DETECTION DEVICE, ELECTRONIC DEVICE, AND ROBOT

(75) Inventors: Tomo Ikebe, Suwa (JP); Sumio Utsunomiya, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 491 days.

(21) Appl. No.: 13/190,889

(22) Filed: Jul. 26, 2011

(65) Prior Publication Data

US 2012/0017703 A1    Jan. 26, 2012

(30) Foreign Application Priority Data

Jul. 26, 2010  (JP) ................................ 2010-166792
Jun. 29, 2011  (JP) ................................ 2011-143837

(51) Int. Cl.
| | | |
|---|---|---|
| G01L 1/00 | (2006.01) | |
| G01D 7/00 | (2006.01) | |
| G06F 3/044 | (2006.01) | |
| G06F 3/02 | (2006.01) | |
| B25J 13/08 | (2006.01) | |
| G01L 5/22 | (2006.01) | |
| G06F 3/0338 | (2013.01) | |
| G06F 3/041 | (2006.01) | |
| G01L 5/16 | (2006.01) | |

(52) U.S. Cl.
CPC ............... G01L 5/165 (2013.01); G06F 3/044 (2013.01); G06F 3/0202 (2013.01); B25J 13/083 (2013.01); G01L 5/226 (2013.01); G06F 3/0338 (2013.01); G06F 3/0414 (2013.01)
USPC .................... 73/862.626; 73/780; 73/862.041

(58) Field of Classification Search
CPC ........ B25J 13/083; G01L 5/165; G01L 5/226; G06F 3/0202; G06F 3/0338; G06F 3/0414; G06F 3/044
USPC ..................................................... 73/862.626
See application file for complete search history.

(56) References Cited

U.S. PATENT DOCUMENTS

2002/0162401 A1*  11/2002  Bachinski et al. ......... 73/861.65
2006/0097970 A1*  5/2006   Takeda et al. .................. 345/89

FOREIGN PATENT DOCUMENTS

| JP | A-60-135834 | 7/1985 |
| JP | A-7-128163 | 5/1995 |
| JP | 2007187502 A * | 7/2007 |
| JP | A-2009-176183 | 8/2009 |

* cited by examiner

*Primary Examiner* — Lisa Caputo
*Assistant Examiner* — Brandi N Hopkins
(74) *Attorney, Agent, or Firm* — Oliff PLC

(57) ABSTRACT

Disclosed is a detection device for detecting a strength and a direction of an external force applied to a reference point, the detection device including: a first substrate having a plurality of first capacitor electrodes arranged around the reference point; a second substrate arranged to face the first substrate by interposing the first capacitor electrodes; a dielectric body arranged between the first and second substrates and made of an elastic body or fluid; a second capacitor electrode arranged to face the first capacitor electrodes by interposing the dielectric body between the first and second substrates; and a third substrate having an elastic projection which has a gravity center in a location overlapping with the reference point and is elastically deformed by the external force while a tip thereof abuts on the second substrate.

12 Claims, 22 Drawing Sheets

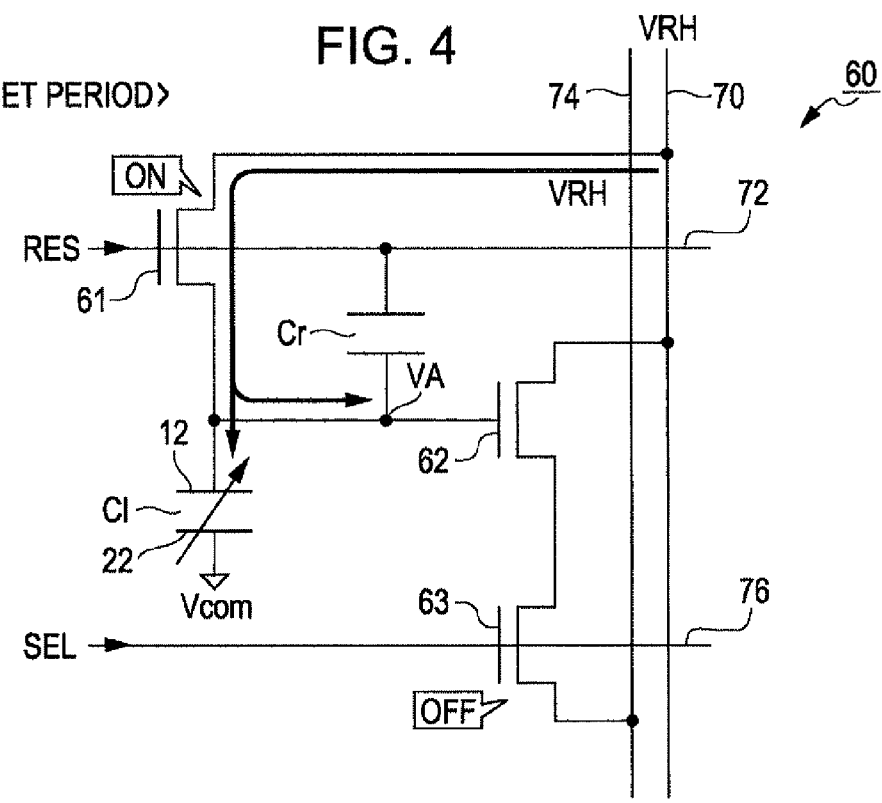
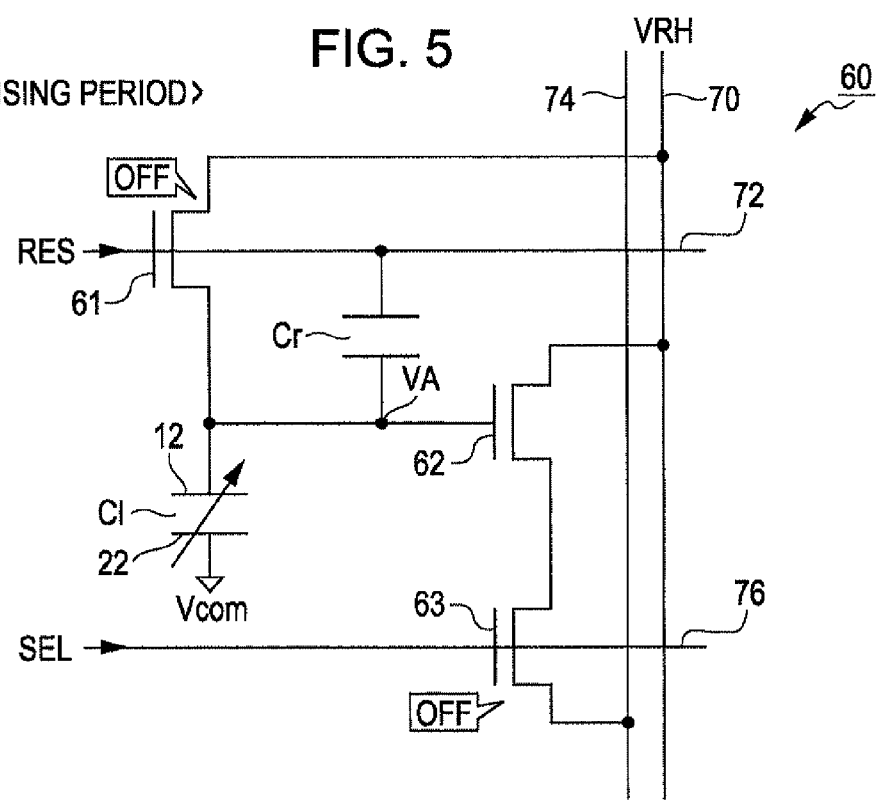

DETECTION DEVICE, ELECTRONIC DEVICE, AND ROBOT

This application claims priority to Japan Patent Application No. 2010-166792 filed Jul. 26, 2010 and Japanese Application No. 2011-143837 filed Jun. 29, 2011, the entire disclosures of which are hereby incorporated by reference in their entireties.

BACKGROUND

1. Technical Field

The present invention relates to a detection device, an electronic device, and a robot.

2. Related Art

Detection devices for detecting an external force are disclosed in JP-A-60-135834, JP-A-7-128163, and JP-A-2009-176183. In recent studies, application of these detection devices to a touch panel or a haptic sensor in a robot has been reviewed.

JP-A-60-135834 discloses a detection device for detecting a pressure distribution based on a deformation amount of projections using a pressure-receiving sheet having conical projections uniformly arranged on a rear surface. However, in the detection device disclosed in JP-A-60-135834, it is not possible to measure a force in the in-plane direction (slipping force) of the pressure applied to the measurement surface.

JP-A-7-128163 discloses a detection device in which a plurality of pillar-like projections are arranged in a grid shape on a surface of a pressure-receiving sheet, and a circular conical projection is provided on the rear surface of a portion obtained by equally dividing the circumference of the surface projections. In the detection device disclosed in JP-A-7-128163, it is possible to detect the external pressure as a three-dimensional force vector, but the detection limitation of the external pressure is determined by a deformation degree of the projections.

JP-A-2009-176183 discloses a detection device that includes a dielectric body layer between a device substrate having a sensing area for detecting the electrostatic capacitance and an opposite substrate and detects a change of the pressure based on a change of the electrostatic capacitance caused by the deformation. However, in the detection device disclosed in JP-A-2009-176183, it is not possible to measure a force of the in-plane direction of the external pressure (slipping force) applied to the measurement surface.

As such, none of the detection devices disclosed in JP-A-60-135834, JP-A-7-128163, and JP-A-2009-176183 succeeded in detecting the strength and the direction of the external pressure with a high precision.

SUMMARY

An advantage of some aspects of the invention is to provide a detection device, an electronic device, and a robot capable of detecting the strength and the direction of the external pressure with a high precision.

According to an aspect of the invention, there is provided a detection device for detecting a strength and a direction of an external pressure applied to a reference point, the detection device including: a first substrate having a plurality of first capacitor electrodes arranged in the around of the reference point; a second substrate arranged to face the first substrate by interposing the first capacitor electrodes; a dielectric body arranged between the first and second substrates and made of an elastic body or fluid; a second capacitor electrode arranged to face the first capacitor electrodes by interposing the dielectric body between the first and second substrates; and a third substrate having an elastic projection which has a gravity center in a location overlapping with the reference point and is elastically deformed by the external pressure while a tip thereof abuts on the second substrate.

In such a detection device, it is possible to increase a detection precision in the direction of the external pressure using a two-stage configuration including the elastic projection and the dielectric body in comparison with the detection devices disclosed in JP-A-60-135834 and JP-A-7-128163. As the external pressure is applied to the surface of the third substrate in a predetermined direction, the elastic projection is compressively deformed to a certain thickness. As the applied external pressure increases, a critical point at which the elastic projection is not deformed any more is reached. If the external pressure exceeding the critical point is applied to the elastic projection, the dielectric body is flexibly deformed. For this reason, it is possible to detect the external pressure having a strength exceeding the critical point of the elastic projection. In addition, deformation of the elastic projection is deviated by the external pressure in a predetermined direction. That in a case where a slipping force component in a predetermined in-plane direction exists in the external pressure, the gravity center of the elastic projection is deviated from the reference point and moves to a predetermined direction (slipping direction). Then, the thickness of the dielectric body is relatively reduced in a portion into which the gravity center of the elastic projection moves. That is, different electrostatic capacitances are detected from each capacitance detection element. Specifically, in the capacitance detection element in a location overlapping with the gravity center of the elastic projection, a relatively high electrostatic capacitance is detected. In the capacitance detection element in a location not overlapping with the gravity center of the elastic projection, a relatively low electrostatic capacitance is detected. Therefore, differences of the electrostatic capacitances detected from each capacitance detection element are calculated using a calculation device, and it is possible to obtain the strength and the direction of the external pressure based on the differences. Therefore, it is possible to provide a detection device capable of detecting the strength and the direction of the external pressure with a high precision.

It is preferable that the aforementioned detection device may further include a calculation device for computing differences of electrostatic capacitance values of each capacitance detection element obtained by arbitrarily combining electrostatic capacitance values of a plurality of capacitance detection elements, including the first capacitor electrode, the second capacitor electrode, and the dielectric body, that change depending on the elastic deformation of the elastic projection caused by an external pressure, and computing the strength and the direction of the external pressure based on the differences.

In the aforementioned detection device, it is preferable that the capacitance detection element may be capable of distinguishably detecting a change of the electrostatic capacitance value caused by elastic deformation of the elastic projection and a change of the electrostatic capacitance value caused by deformation of the dielectric body.

In such a detection device, it is possible to facilitate detection of the external pressure in comparison with a case where the capacitance detection elements collectively detect a change of the electrostatic capacitance value caused by elastic deformation and a change of the electrostatic capacitance value caused by deformation of the dielectric body of the elastic projection. For example, assuming that the dielectric body is not deformed until the elastic projection experiences the critical point, it is possible to obtain the strength and the direction of the external pressure by detecting only a change of the electrostatic capacitance value caused by the elastic deformation of the elastic projection. Therefore, it is possible to facilitate calculation of the difference of the electrostatic capacitance values of each capacitance detection element and efficiently detect the external pressure.

In the aforementioned detection device, it is preferable that a plurality of the first capacitor electrodes may be point-symmetrically arranged with respect to the reference point.

In such a detection device, since distances between the reference point and each first capacitor electrode are made to be equal, relationships between the deformation amount of the elastic projection and the electrostatic capacitance values detected by each capacitance detection element, each including first and second capacitor electrodes, are made to be equal. For example, in a case where a plurality of first capacitor electrodes are arranged with different distances from the reference point, the electrostatic capacitance values detected from each capacitance detection element are different even when the deformation amount of the elastic projection is the same. For this reason, it is necessary to provide a correction coefficient depending on the arrangement locations of each first capacitor electrode when the differences of the detection capacitances are calculated. However, in the present configuration, since the deformation amount of the elastic projection and the electrostatic capacitance values detected from each capacitance detection element are made to be equal, the aforementioned correction coefficient is not necessary. Therefore, it is possible to facilitate calculation of the strength and the direction of the external pressure based on the differences of the electrostatic capacitance value of each capacitance detection element, and efficiently detect the external pressure.

In the aforementioned detection device, it is preferable that a plurality of the first capacitor electrodes may be arranged in a matrix shape along two perpendicular directions.

In such a detection device, it is possible to facilitate calculation of the strength and the direction of the external pressure based on the differences of the electrostatic capacitance values of each capacitance detection element obtained by arbitrarily combining the electrostatic capacitance values of each capacitance detection element, each including the first and second capacitor electrodes.

In the aforementioned detection device, it is preferable that the second capacitor electrode may be arranged in the second substrate.

In such a detection device, a vector component of the electric field applied between the first and second capacitor electrodes contains a large number of components in a direction parallel to the thickness direction of the dielectric body in comparison with a case where the first and second capacitor electrodes are arranged in the same substrate. That is, a vector component of the electric field applied between the first and second capacitor electrodes is made to be equal to the direction of the external pressure. Therefore, it is possible to detect the strength and the direction of the external pressure with a high precision.

In the aforementioned detection device, it is preferable that the second capacitor electrode may be arranged in a location overlapping with the reference point of the first substrate.

In such a detection device, it is possible to form the first and second capacitor electrodes through the same process. Therefore, it is possible to simplify the manufacturing process and facilitate improved manufacturing efficiency and reduced manufacturing cost. In addition, since it is possible to suppress the second substrate from being warped during a heating process of the manufacturing process, it is possible to improve the detection precision of the external pressure. In addition, since the distance between electrodes can be constantly retained in the course of deformation of the elastic projection, it is possible to detect the strength and the direction of the external pressure with a high precision.

In the aforementioned detection device, it is preferable that a plurality of first capacitor electrodes may be arranged in at least four rows and four columns along two perpendicular directions.

In such a detection device, the number of the arranged first capacitor electrodes can increase. For this reason, it is possible to obtain the direction of the external pressure by integrating the calculation results of each capacitance detection element based on the electrostatic capacitances detected from a plurality of capacitance detection elements. Therefore, it is possible to detect the strength and the direction of the external pressure with a high precision.

In the aforementioned detection device, it is preferable that the third substrate may include a plurality of elastic projections, and a plurality of the elastic projections are arranged separately from one another.

In such a detection device, it is possible to allow for a deformation amount in a direction parallel to the in-plane direction of the third substrate mainframe when the elastic projection is elastically deformed. For example, it is possible to suppress one elastic projection from being affected by deformation of other elastic projections. For this reason, it is possible to accurately deliver the external pressure to the dielectric body in comparison with a case where a plurality of elastic projections are arranged to make contact with one another. Therefore, it is possible to detect the strength and the direction of the external pressure with a high precision.

In the aforementioned detection device, it is preferable that a spacer for constantly retaining a distance between the first and second substrates may be arranged at least in a boundary of the adjacent elastic projections between the first and second substrates.

In such a detection device, the external pressure is applied to each unit detection area surrounded by the spacer. For this reason, in the unit detection area surrounded by the spacer, it is possible to independently detect the external pressure without being influenced by other unit detection areas. Therefore, it is possible to detect the strength and the direction of the external pressure with a high precision.

In the aforementioned detection device, it is preferable that a reinforcing member having stiffness higher than that of the third substrate may be arranged in a side of the third substrate opposite to a side of the elastic projection.

In such a detection device, for example, when the external pressure is applied to the area between two neighboring elastic projections, it is possible to suppress the two neighboring elastic projections from being compressively deformed in an opposite direction to each other in comparison with a case where there is no reinforcing member. That is, it is possible to suppress erroneous detection in which the external pressure is detected in the opposite direction. Therefore, it is possible to detect the strength and the direction of the external pressure with a high precision.

According to another aspect of the invention, an electronic device includes the aforementioned detection device.

In such an electronic device, since the aforementioned detection device is provided, it is possible to provide an electronic device capable of detecting the strength and the direction of the external pressure with a high precision.

According to still another aspect of the invention, a robot includes the aforementioned detection device.

In such a robot, since the aforementioned detection device is provided, it is possible to provide a robot capable of detecting the strength and the direction of the external pressure with a high precision.

BRIEF DESCRIPTION OF THE DRAWINGS

The invention will be described with reference to the accompanying drawings, wherein like numbers reference like elements.

FIG. 4 is an explanatory diagram illustrating operation of the sensing circuit during a reset period.

FIG. 5 is an explanatory diagram illustrating operation of the sensing circuit during a sensing period.

DESCRIPTION OF EXEMPLARY EMBODIMENTS

Embodiments of the invention will now be described with reference to the accompanying drawings. The embodiments provide only an exemplary aspect of the invention, are not intended to limit the invention, and may be arbitrarily modified without departing from the technical spirit and scope of the invention. In the following drawings, actual structures may be scaled or numerical values may be changed for clearer understanding.

Figure 1:
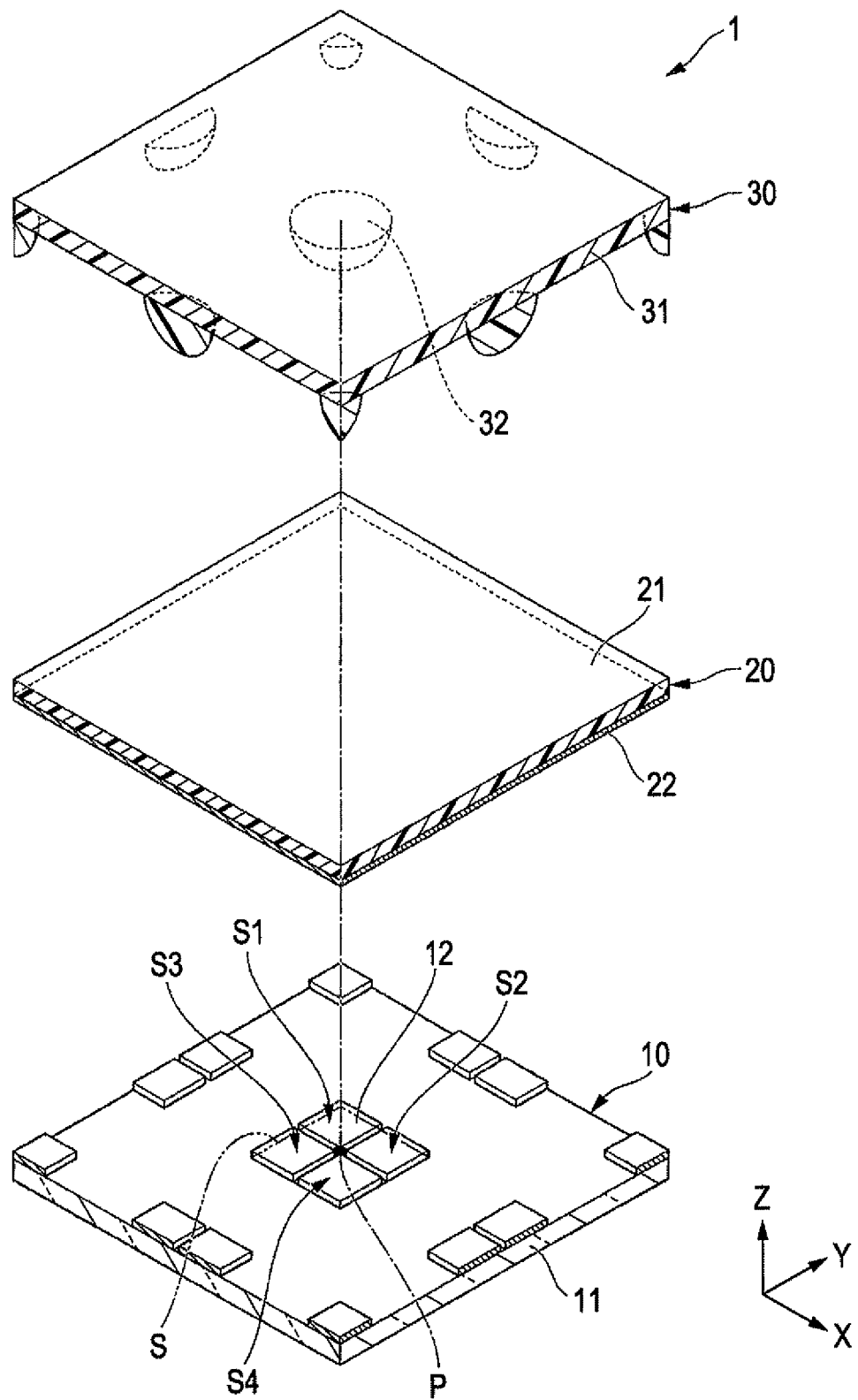
FIG. 1 is an exploded perspective view illustrating a schematic configuration of a detection device according to a first embodiment of the invention.

In the following description, an XYZ rectangular coordinate system is set as shown in FIG. 1, and description will be made for each of the members with respect to the XYZ rectangular coordinate system. In the XYZ rectangular coordinate system, the X-axis and Y-axis are set to be in parallel with a first substrate 10, and the Z-axis is set to be perpendicular to the first substrate 10.

First Embodiment

FIG. 1 is an exploded perspective view illustrating a schematic configuration of a detection device 1 according to a first embodiment of the invention. In FIG. 1, illustration of a dielectric body 40 is omitted for the purpose of simplicity (refer to FIG. 7). In FIG. 1, the reference symbol P denotes a reference point, and the reference symbol S denotes a unit detection area detected by a plurality of capacitance detection elements S1 to S4 (including a first capacitor electrode 12, a second capacitor electrode 22, and a dielectric body 40) arranged to match with a single elastic projection 32.

The detection device 1 is an electrostatic capacitance type touch pad for detecting a direction of the external pressure applied to the reference point, and is used as, for example, a pointing device instead of a mouse in electronic devices such as a laptop computer. In addition, the "reference point" refers to a point where a gravity center of the elastic projection is positioned with no slipping force being applied.

Referring to FIG. 1, the detection apparatus 1 includes: a first substrate 10 having a plurality of first capacitor electrodes 12 arranged in the around of the reference point P, a second substrate 20 arranged to face the first substrate 10 by interposing a first capacitor electrode 12, a dielectric body 40 arranged between the first and second substrates 10 and 20 (refer to FIGS. 7A to 7C), and a third substrate 30 having an elastic projection 32 which has a gravity center positioned in a location overlapping with the reference point P and is elastically deformed by the external pressure while a tip thereof abuts on the second substrate 20.

The detection apparatus 1 is provided with a calculation device (not shown) which calculates differences of the electrostatic capacitances of each capacitance detection element obtained by arbitrarily combining the electrostatic capacitance values of a plurality of capacitance detection elements S1 to S4, that change depending on the elastic deformation of the elastic projection 32 caused by an external pressure, and calculates the strength and the direction of the external pressure based on the differences.

The capacitance detection elements are adapted to distinguishably detect a change of the electrostatic capacitance value caused by elastic deformation of the elastic projection 32 and a change of the electrostatic capacitance value caused by deformation of the dielectric body 40.

In addition, according to the present the embodiment, the first capacitor electrode 12 is disposed in the first substrate 10, and the second capacitor electrode 22 is disposed in the second substrate 20. That is, a vertical electric field type is employed, in which an electric field in a vertical direction (Z-direction) is applied to the dielectric body 40 between the first and second capacitor electrodes 12 and 22.

The first substrate 10 includes a first substrate mainframe 11 having a rectangular panel shape made of, for example, glass, quartz, plastic, or the like and a plurality of first capacitor electrodes 12 arranged in the first substrate mainframe 11. For example, the vertical and horizontal sizes of the first substrate mainframe 11 (the size as seen in a plan view) are set to about 55 mm by 56 mm.

A plurality of first capacitor electrodes 12 are point-symmetrically arranged with respect to the reference point P. For example, a plurality of first capacitor electrodes 12 are arranged in a matrix shape along two perpendicular directions (X and Y directions). As a result, since distances between the reference point P and each first capacitor electrode 12 are made to be equal, the electrostatic capacitance values detected from each capacitance detection element S1 to S4, each including first and second capacitor electrodes 12 and 22, are made to be equal. Accordingly, it is possible to facilitate calculation of the differences of the electrostatic capacitance values of each capacitance detection element S1 to S4 obtained by arbitrarily combining the electrostatic capacitance values of each capacitance detection element S1 to S4. The calculation method of the differences of the electrostatic capacitance values will be described below.

The interval between the neighboring first capacitor electrodes 12 is set to about 0.1 mm. Therefore, noise that may be generated due to disturbance or influence of electrostatic charges is not added to the electrostatic capacitance values detected by the neighboring capacitance detection element S1 to S4.

As a plurality of first capacitor electrodes 12, a total of four first capacitor electrodes 12 are arranged in two rows and two columns in each unit detection area S. A gravity center of the four first capacitor electrodes 12 (the gravity center of the unit detection area S) is denoted by a reference point P. For example, the size of the unit detection area S (the size as seen in a plan view) is set to 2.8 mm×2.8 mm. In addition, the areas of the four first capacitor electrodes 12 are set to be approximately equal. The first capacitor electrode 12 may be formed of for example, a metal material such as aluminum (Al).

The second substrate 20 includes a rectangular panel-shaped second substrate mainframe 21 made of, for example, a material such as plastic and a second capacitor electrode 22 arranged in the second substrate mainframe 21. The second substrate mainframe 21 is formed to have a thickness allowing for flexibility when the external pressure is applied to a contact surface. In addition, the second substrate mainframe 21 is formed to have the same size as that of the first substrate mainframe 11 as seen in a plan view.

The second capacitor electrode 22 is arranged to overlap with the entire area of a plurality of first capacitor electrodes 12. Specifically, the second capacitor electrode 22 is formed to extend across the entire exposed portion of the lower surface of the second substrate mainframe 21. The second capacitor electrode 22 may be formed of, for example, a metal material such as aluminum (Al) similar to the first capacitor electrode 12.

The dielectric body 40 (refer to FIGS. 7A to 7C) is made of an elastic body or fluid arranged between the first and second substrates 10 and 20. The dielectric body 40 may be made of, for example, an elastic body such as rubber or fluid such as silicon oil or liquid crystal.

A plurality of spacers (not shown) are arranged between the first and second substrates 10 and 20 to retain a constant interval between the first and second substrates 10 and 20. A plurality of spacers are arranged in an outer circumference of a matrix-shaped area having the elastic projections 32. As a result, the dielectric body 40 is formed to have a constant thickness in the Z direction between the first and second substrates 10 and 20.

The third substrate 30 includes a rectangular panel-shaped third substrate mainframe 31 and a plurality of elastic projections 32 arranged in the third substrate mainframe 31. The third substrate mainframe 31 is a portion directly receiving the external pressure. The third substrate mainframe 31 may be formed of, for example, a material such as glass, quartz, and plastic or a resin material such as foamed urethane resin. In the present embodiment, the third substrate mainframe 31 and the elastic projection 32 are made of a resin material and integrated into a single body using a mold.

A plurality of elastic projections 32 are arranged in a matrix shape along the X and Y directions on the third substrate mainframe 31. The tip of the elastic projection 32 has a spherical conical shape and abuts on the second substrate mainframe 21. The gravity center of the elastic projection 32 is positioned in a location overlapping with the reference point P. In addition, a plurality of elastic projections 32 are arranged separately from one another. For this reason, it is possible to allow for a deformation amount in a direction parallel to an in-plane direction of the third substrate mainframe 31 when the elastic projection 32 is elastically deformed.

The size of the elastic projection 32 may be arbitrarily set. Here, a diameter of a base portion of the elastic projection 32 (a diameter of a portion of the elastic projection 32 making contact with the third substrate mainframe 31) is set to approximately 1.8 mm. A height of the elastic projection 32 (a distance of the elastic projection 32 in the Z direction) is set to approximately 2 mm. An interval between neighboring elastic projections 32 is set to approximately 1 mm. A durometer hardness (type A, a hardness measurement using an ISO7619 compliant durometer) of the elastic projection 32 is set to approximately 30.

Figure 2:
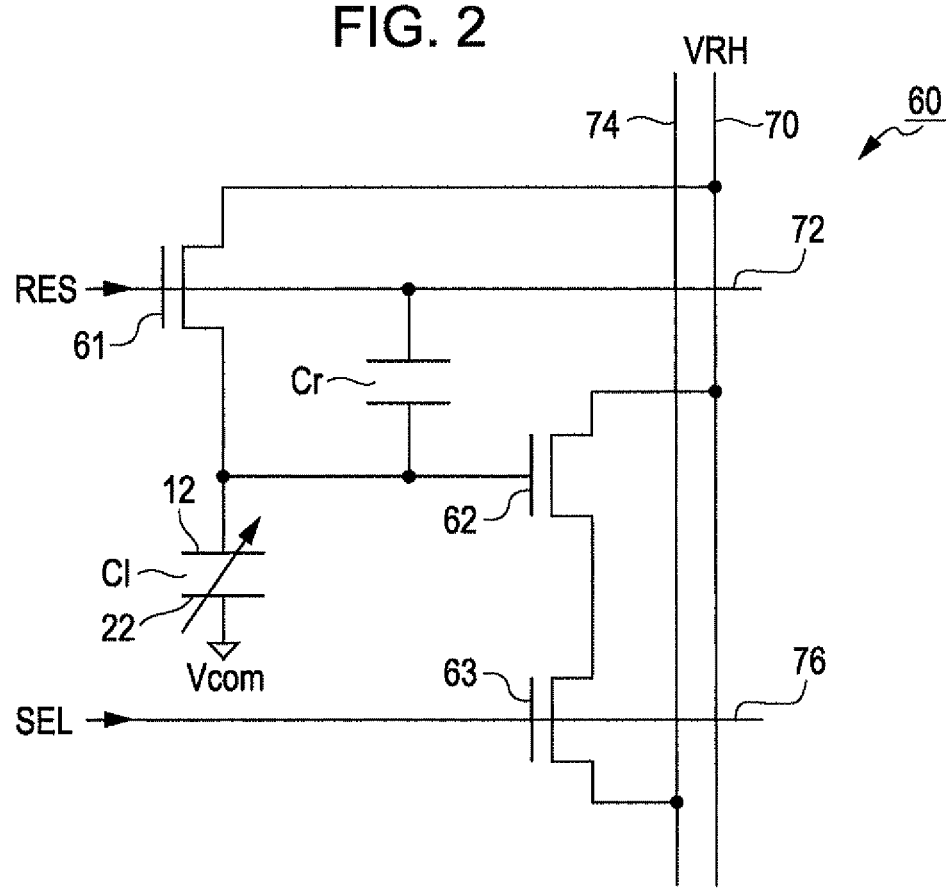
FIG. 2 is a circuit diagram illustrating a configuration of a sensing circuit according to a first embodiment.

FIG. 2 is an equivalent circuit diagram illustrating a sensing circuit for detecting the external pressure using the capacitance detection element. In FIG. 2, the reference symbol Cl denotes the capacitance detection element (denoted by the reference symbols S1 to S4 in FIG. 1). The sensing circuit 60 includes a reset transistor 61, an amplification transistor 62, a selection transistor 63, a reference capacitance element Cr, and a capacitance detection element Cl. The capacitance detection element Cl includes a first capacitor electrode 12 and a second capacitor electrode 22, and the second capacitor electrode 22 is supplied with a common electric potential Vcom.

A drain of the reset transistor 61 is connected to a power line 70. A source of the reset transistor 61 is connected to a gate of the amplification transistor 62. The power line 70 is supplied with a power electric potential VRH. A gate of the reset transistor 61 is connected to a first control line 72. The first control line 72 is supplied with a reset signal RES.

A drain of the amplification transistor 62 is connected to the power line 70. A source of the amplification transistor 62 is connected to a drain of the selection transistor 63. The reference capacitance element Cr is provided between the gate of the amplification transistor 62 and the first control line 72. In addition, a gate of the amplification transistor 62 is connected to the first capacitor electrode 12 of the capacitance detection element Cl.

A source of the selection transistor 63 is connected to a detection line 74. A gate of the selection transistor 63 is connected to a second control line 76. The second control line 76 is supplied with a selection signal SEL.

Circuit Operation

Next, operation of the sensing circuit 60 will be described with reference to FIGS. 3 to 6.

Figure 3:
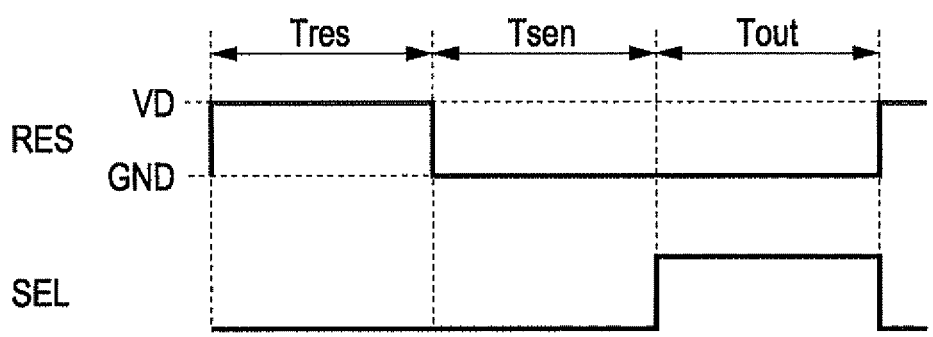
FIG. 3 is a timing chart illustrating operation of the sensing circuit according to a first embodiment.
Figure 6:
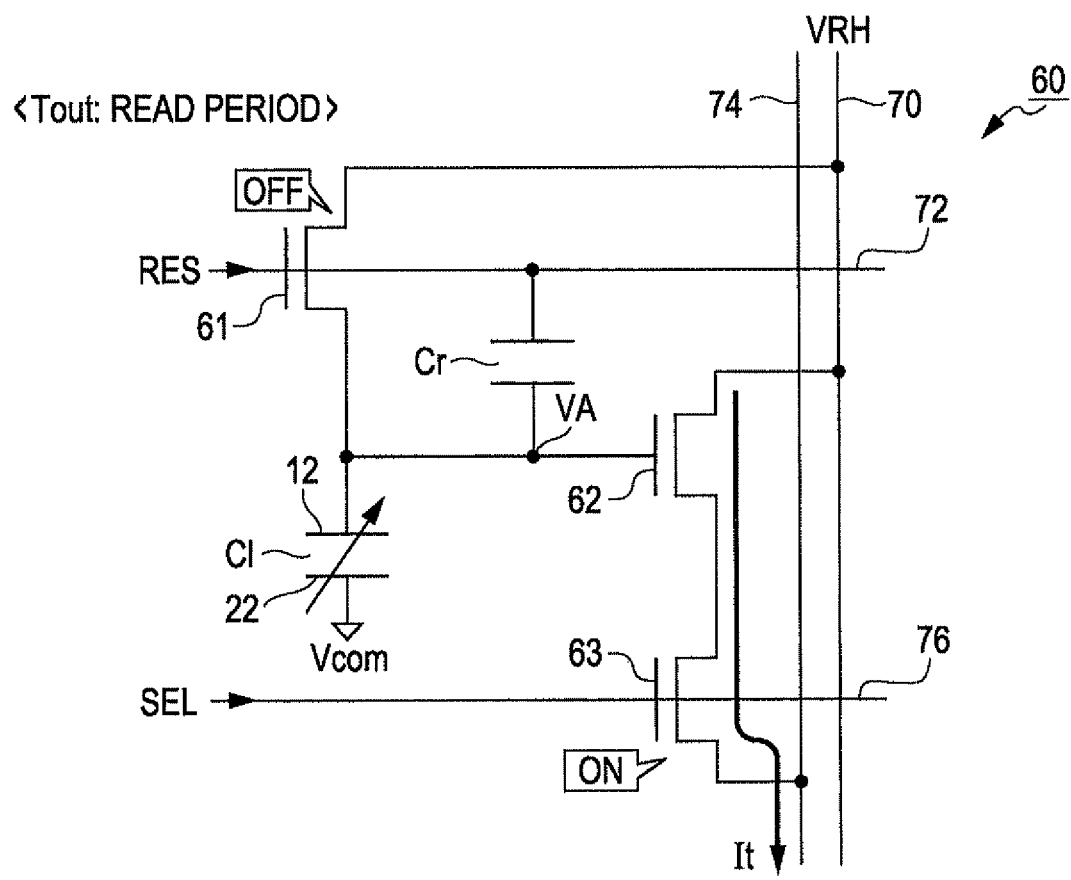
FIG. 6 is an explanatory diagram illustrating operation of the sensing circuit during a read period.

FIG. 3 is a timing chart illustrating operation of the sensing circuit 60 according to the present embodiment. FIG. 4 is an explanatory diagram illustrating operation of the sensing circuit 60 during a reset period. FIG. 5 is an explanatory diagram illustrating operation of the sensing circuit 60 during a sensing period. FIG. 6 is an explanatory diagram illustrating operation of the sensing circuit 60 during a read period.

As shown in FIG. 3, the sensing circuit 60 is operated by using the reset period Tres, the sensing period Tsen, and the read period Tout as a single unit.

Reset Period

First, in the reset period Tres, the level of the reset signal RES supplied to the first control line 72 is set to an electric potential VD. That is, in the reset period Tres, the level of the reset signal RES is set to a high level so that the reset transistor 61 is turned on. Meanwhile, the selection signal SEL supplied to the second control line 76 is set to a low level so that the selection transistor 63 is turned off. As such, as shown in FIG. 4, the gate electric potential VA of the amplification transistor 62 is set (reset) to the power electric potential VRH. In addition, the first capacitor electrode 12 of the capacitance detection element Cl is also supplied with the power electric potential VRH so that the voltage between the first capacitor electrode 12 of the capacitance detection element Cl and the second capacitor electrode 22 is set to a voltage VRH-Vcom.

Sensing Period

Next, in the sensing period Tsen followed by the reset period Tres, the level of the reset signal RES changes from VD to GND (=0 V). Then, as shown in FIG. 5, the reset transistor 61 is turned off. In addition, in the sensing period Tsen, the selection signal SEL is set to a low level so that the selection transistor 63 is turned off. Since an impedance of the gate of the amplification transistor 62 is sufficiently high, the gate of the amplification transistor 62 becomes an electrically floating state in the sensing period Tsen. Since one electrode of the reference capacitance element Cr is connected to the first control line 72, the level of the reset signal RES supplied to the first control line 72 changes from VD to GND. Then, in response, the electric potential VA of the gate of the amplification transistor 62 also changes. A change amount of the electric potential VA of the gate at this moment corresponds to a capacitance ratio between the reference capacitance element Cr and the capacitance detection element Cl.

Read Period

In the read period Tout followed by the sensing period Tsen, the selection signal SEL changes from a low level to a high level. Then, as shown in FIG. 6, the selection transistor 63 is turned on. As a result, a detection electric current It corresponding to the electric potential VA of the gate of the amplification transistor 62 flows through the detection line 74. Such a detection electric current it is supplied to a detection circuit (not shown) for detecting a contact between a target object (for example, a finger) and the detection apparatus 1.

In the sensing period Tsen, as the capacitance value of the capacitance detection element Cl changes, the electric potential VA of the amplification transistor 62 also changes in response. Therefore, a value of the detection electric current It output in the read period Tsen when the target object does not make contact with the detection apparatus 1 is different from a value of the detection electric current It output in the read period Tsen when the subject object makes contact with the detection apparatus 1.

Here, if a capacitance value of the capacitance detection element Cl under the condition that the target object does not make contact with the detection apparatus 1 is denoted by Clc, a change amount of the capacitance value of the capacitance detection element Cl when the target object makes contact with the detection apparatus 1 is denoted by ΔClc, and a capacitance value of the reference capacitance element Cr is denoted by Cref, and an electric potential change on the first control line 72 is denoted by ΔV (=VD), a change amount ΔVA of the gate electric potential VA of the amplification transistor 62 when the target object makes contact with the detection apparatus 1 can be expressed as the following Equation (1), where a parasitic capacitance is neglected.

[Equation 1]

$$\Delta VA = \{(Cref \times \Delta Clc) \times \Delta V\} / \{(Cref + Clc + \Delta Clc)(Cref + Clc)\} \quad (1)$$

The detection circuit (not shown) detects a contact between the target object and the detection apparatus 1 based on the value of the detection electric current It (corresponding to the detection signal). As the change amount ΔVA of the electric potential VA of the gate when the target object makes contact with the detection apparatus 1 increases, a difference between the value of the detection electric current It under the non-contact condition and the value of the detection electric current It under the contact condition increases, and the detection sensitivity also increases.

FIGS. 7A to 7C and FIGS. 8A to 8C are explanatory diagrams illustrating a method of detecting the strength and the direction of the external pressure applied to the reference point P.

Figure 7A:
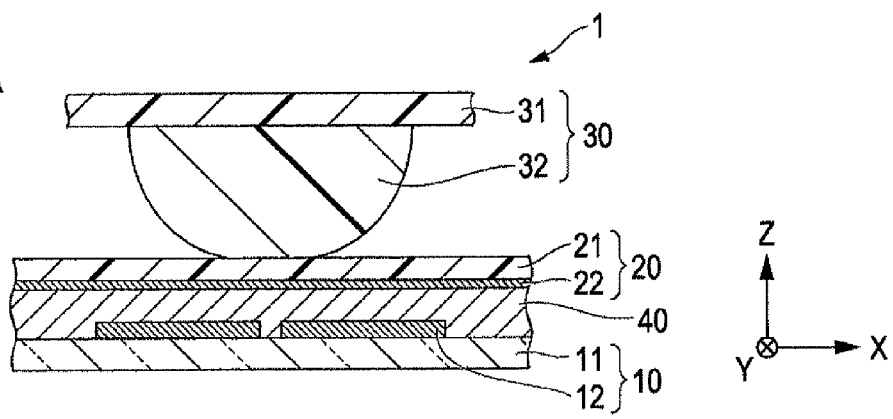
FIGS. 7A to 7C are cross-sectional views illustrating change of an electrostatic capacitance using a capacitance detection element according to a first embodiment.
Figure 7B:
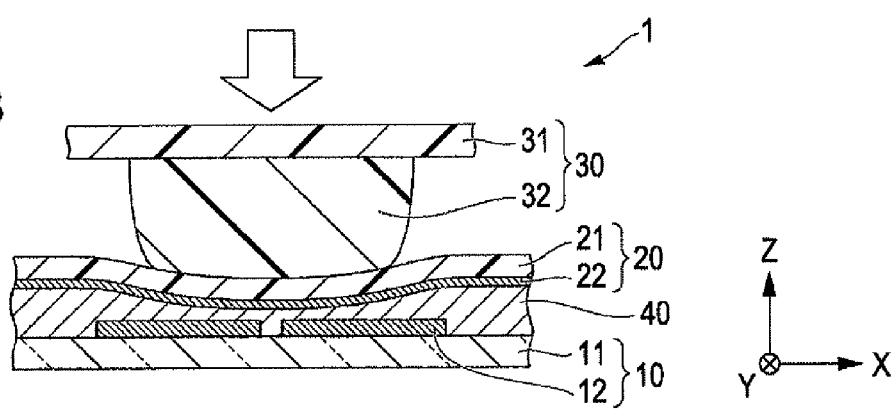
Figure 7C:
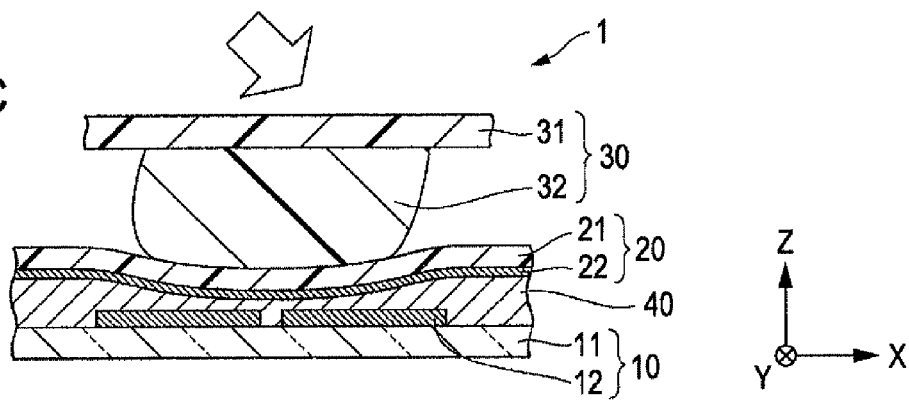
Figure 8A:
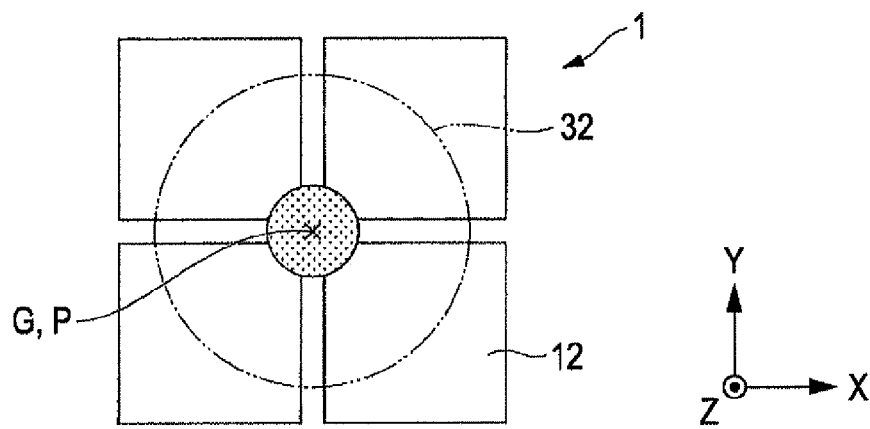
FIGS. 8A to 8C are plan views illustrating change of an electrostatic capacitance using a capacitance detection element according to a first embodiment.
Figure 8B:
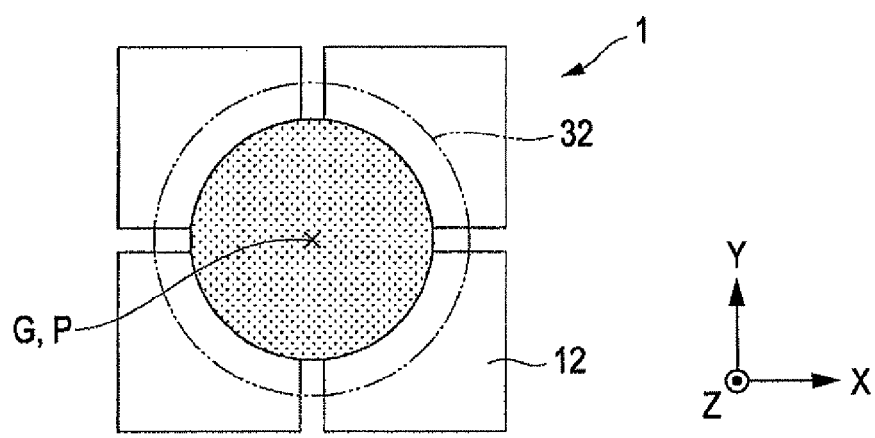
Figure 8C:
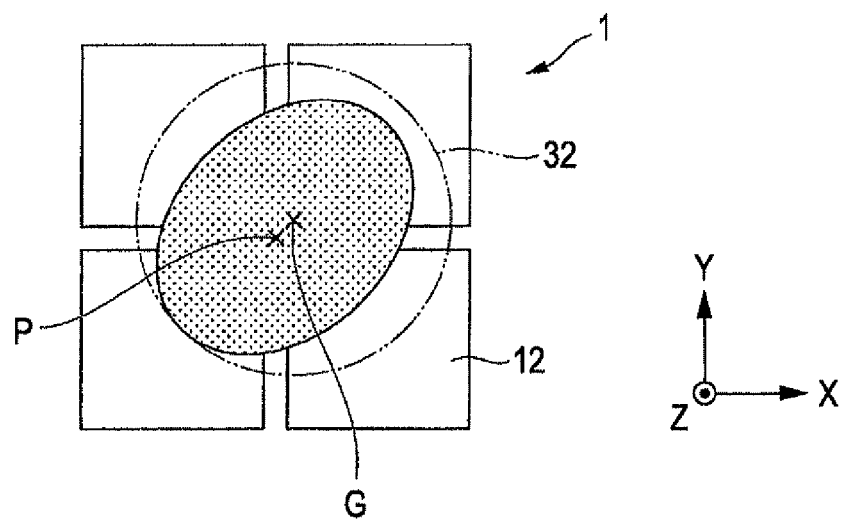

FIGS. 7A to 7C are cross-sectional views illustrating a change of the electrostatic capacitance using the capacitance detection element according to a first embodiment. FIGS. 8A to 8C are cross-sectional views illustrating a change of the electrostatic capacitance using the capacitance detection element according to a first embodiment in conjunction with FIGS. 7A to 7C. Specifically, FIGS. 7A and 8A illustrate a condition before an external pressure is applied to the surface of the third substrate 30 (no external pressure is applied). FIGS. 7B and 8B illustrate a condition that an external pressure is applied to the surface of the third substrate 30 in a vertical direction (no slipping force is exerted). FIGS. 7C and 8C illustrate a condition that an external pressure is applied to the surface of the third substrate 30 in an inclined direction (the slipping force is exerted). In FIGS. 8A to 8C, the reference symbol G denotes a gravity center (a pressure gravity center) of the elastic projection 32.

As shown in FIGS. 7A and 8A, before the external pressure is applied to the surface of the third substrate 30, the elastic projection 32 is not deformed. As a result, a distance between the first and second capacitor electrodes 12 and 22 is constantly retained. At this moment, the gravity center G of the elastic projection 32 is positioned in the location overlapping with the reference point P. Electrostatic capacitance values of each capacitance detection element S1 to S4 are stored in a memory (not shown). The strength or the direction of the external pressure is obtained based on the electrostatic capacitance values of each capacitance detection element S1 to S4 stored in the memory.

As shown in FIGS. 7B and 8B, when the external pressure is applied to the surface of the third substrate 30 in a vertical direction, the elastic projection 32 is compressively deformed in a Z direction while the tip thereof abuts on the surface of the second substrate 20. As a result, the second substrate 20 is bent in a −Z direction, and the distance between the first and second capacitor electrodes 12 and 22 is reduced in comparison with a case where no external pressure is applied. That is, the electrostatic capacitance value of the capacitance detection element at this moment increases in comparison with a case where no external pressure is applied.

The elastic projection 32 is compressively deformed depending on the strength of the external pressure. As the external pressure increases, deformation of the elastic projection 32 reaches a critical point where no more deformation occurs. If the external pressure applied to the elastic projection 32 exceeds the critical point, the dielectric body 40 is flexibly deformed in a Z direction. For this reason, it is possible to detect the external pressure having a strength exceeding the critical point for deformation of the elastic projection 32.

As shown in FIGS. 7C and 8C, when an external pressure is obliquely applied to the surface of the third substrate 30, the elastic projection 32 is compressively deformed with an inclination while a tip thereof abuts on the surface of the second substrate 20. As a result, the second substrate 20 is bent in a −Z direction, and a distance between the first and second capacitor electrodes 12 and 22, is reduced in comparison with a case where no external pressure is applied. In addition, the −X directional component of the bending amount of the second substrate 20 is larger than +X direction component thereof. At this moment, the gravity center G of the elastic projection 32 is deviated from the reference point P in the +X direction and the +Y direction. In this case, the overlapping areas between the tip of the elastic projection 32 and four first capacitor electrodes 12 are different from one another. Specifically, comparing the overlapping areas between the tip of the elastic projection 32 and four first capacitor electrodes 12, the area overlapping with the portions arranged in the +X and +Y directions is larger than the area overlapping with the portions arranged in the −X and −Y directions of the four first capacitor electrodes 12.

The elastic projection 32 is compressively deformed with an inclination depending on the strength of the external pressure. As the external pressure increases, a critical point where no more deformation occurs is reached. In addition, deformation of the elastic projection 32 is deviated by the external pressure in an inclined direction. That is, the gravity center of the elastic projection 32 is deviated from the reference point P and moves into the slipping direction (X and Y directions). Then, the thickness of the dielectric body 40 of a portion into which the gravity center of the elastic projection 32 moves becomes relatively thinner. That is, different electrostatic capacitance values are detected in each capacitance detection element. Specifically, a relatively high electrostatic capacitance is detected from the capacitance detection element in the location overlapping with the gravity center of the elastic projection 32, and a relative low electrostatic capacitance is detected from the capacitance detection element in the location not overlapping with the gravity center of the elastic projection 32. In addition, the strength and the direction of the external pressure are obtained based on a method of computing the differences, which will be described below.

Figure 9:
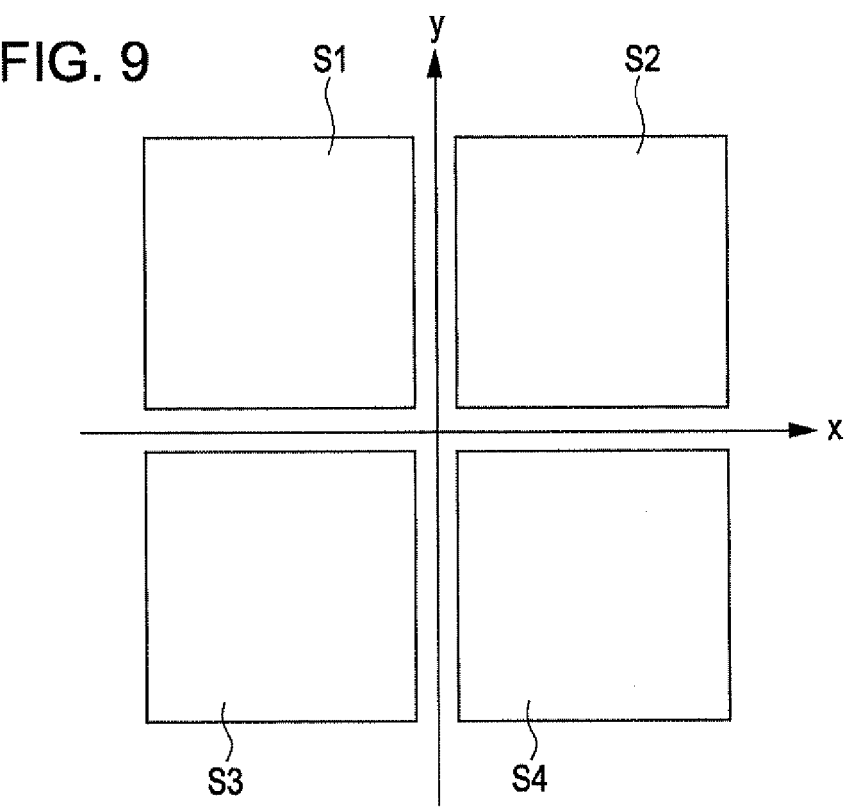
FIG. 9 is a diagram illustrating a coordinate system for a sensing area according to a first embodiment.
Figure 10:
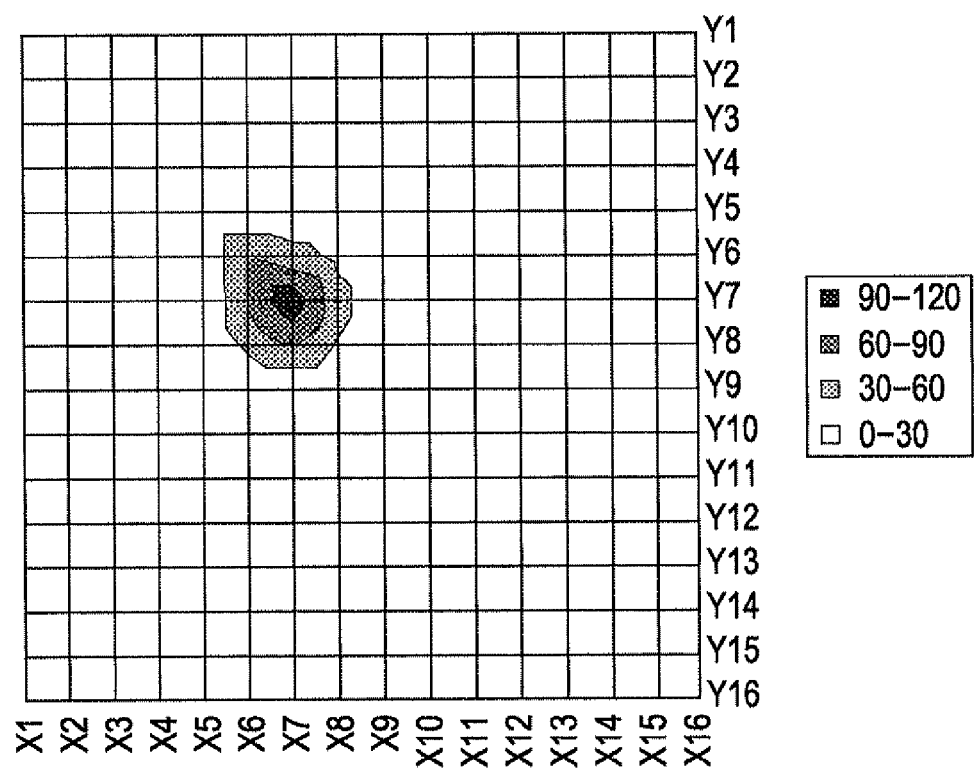
FIG. 10 is a plot illustrating a pressure distribution in a vertical direction using the capacitance detection element according to a first embodiment.
Figure 11:
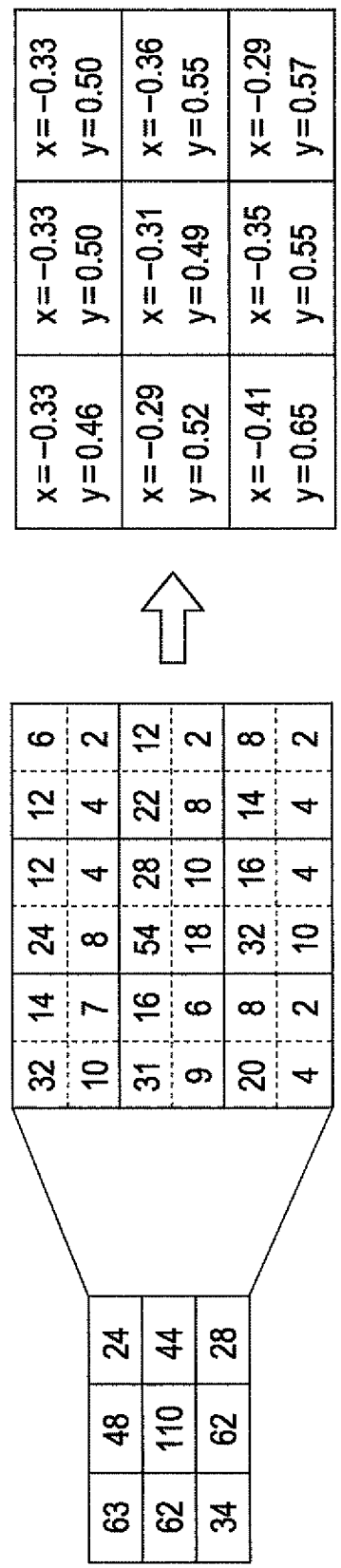
FIG. 11 is a diagram illustrating a calculation example in a slipping direction using the capacitance detection element according to a first embodiment.

FIG. 9 is a diagram illustrating a coordinate system of the sensing area according to a first embodiment. FIG. 10 is a diagram illustrating a pressure distribution in a vertical direction using the capacitance detection element according to a first embodiment. FIG. 11 is a diagram illustrating a calculation example for the slipping direction using the capacitance detection element according to a first embodiment.

As shown in FIG. 9, as a plurality of capacitance detection elements, a total of four capacitance detection elements S1, S2, S3, and S4 are arranged in two rows and two columns in each unit detection area S. Here, if the electrostatic capacitance values (detection values) detected by each capacitance detection element S1, S2, 53, and 54 are denoted by $P_{S1}$, $P_{S2}$, $P_{S3}$, and $P_{S4}$, an X direction component $F_x$ of the external force (a ratio of the force component applied in the X direction out of the in-plane direction components of the external force) can be expressed as the following equation (2).

[Equation 2]

$$F_x = \frac{(P_{S2} + P_{S4}) - (P_{S1} + P_{S3})}{P_{S1} + P_{S2} + P_{S3} + P_{S4}} \quad (2)$$

In addition, the Y direction component $F_y$ of the external force (a ratio of the force component applied in the Y direction out of the in-plane direction components of the external force) can be expressed as the following equation (3).

[Equation 3]

$$F_y = \frac{(P_{S1} + P_{S2}) - (P_{S3} + P_{S4})}{P_{S1} + P_{S2} + P_{S3} + P_{S4}} \quad (3)$$

In addition, the Z direction component $F_z$ of the external force (a vertical direction component of the external force) can be expressed as the following equation (4).

[Equation 4]

$$F_z = P_{S1} + P_{S2} + P_{S3} + P_{S4} \quad (4)$$

In the present embodiment, the differences of the electrostatic capacitance values of each capacitance detection element S1 to S4 obtained by arbitrarily combining the electrostatic capacitance values of each capacitance detection element S1 to S4 that change depending on the elastic deformation of the elastic projection caused by an external pressure are calculated, and the strength and the direction of the external pressure are calculated based on the differences.

As shown in equation (2), for the X direction component $F_X$ of the external pressure, the capacitance detection elements S2 and S4 arranged in the +X direction are combined out of the electrostatic capacitance values of the four capacitance detection elements S1, S2, S3, and S4, and the capacitance detection element S1 and S3 arranged in the −X direction are combined. In this manner, the X direction component of the external pressure is obtained based on differences between the electrostatic capacitance value obtained by combining the capacitance detection elements S2 and S4 arranged in the +X direction and the electrostatic capacitance value obtained by combining the capacitance detection elements S1 and S3 arranged in the −X direction.

As shown in equation (3), for the Y direction component $F_y$ of the external pressure, the capacitance detection elements S1 and S2 arranged in the +Y direction are combined, and the capacitance detection elements S3 and 54 arranged in the −Y direction are combined out of the elastic capacitance values of four capacitance detection elements S1, S2, S3, and S4. In this manner, the Y direction component of the external pressure is obtained based on differences between the electrostatic capacitance value obtained by combining the capacitance detection elements S1 and S2 arranged in the +Y direction and the electrostatic capacitance value obtained by combining the capacitance detection elements S3 and S4 arranged in the −Y direction.

As shown in equation (4), the z direction component Fz of the external pressure is obtained as a resultant force obtained by adding the electrostatic capacitance values of four capacitance detection elements S1, S2, S3, and S4. However, the Z direction component Fz of the external pressure tends to have a higher detection value in comparison with the X direction component Fx and the Y direction component Fy (force component) of the external pressure. For example, if the elastic projection 32 is made of a hard material, or the shape of the tip is sharpened, a detection sensitivity of the external pressure increases. However, if the elastic projection 32 is made of a hard material, the elastic projection 32 is not easily deformed so that the detection value of the external pressure in the in-plane direction is reduced. In addition, if the shape of the tip of the elastic projection 32 is sharpened, a strong sensitivity may be given to the touch feeling (unpleasant feeling) when a user touches the contact surface with a finger. For this reason, in order to match the detection value of the Z direction component Fz of the external pressure with the detection values of the X direction component Fx and the Y direction component Fy of the external pressure, it is necessary to properly correct the detection value using a correction coefficient determined based on a material or a shape of the elastic projection 32.

As shown in FIG. 10, a case will be considered, where a user obliquely presses the upper left location relative to the gravity center of the detection surface of the touch pad with a finger. In this case, the vertical direction pressure component of the external pressure is strongest at the gravity center of a portion receiving the external pressure (about 90 to 120 my). In addition, the vertical direction pressure component of the external pressure gradually decreases in the order of the gravity center, a fringe thereof (about 60 to 90 mV), and the outermost circumference (about 30 to 60 mV). The area not pressed with a finger has a voltage of about 0 to 30 mV. In addition, the unit detection areas (each of which includes a total of four capacitance detection elements S1 to S4 arranged in two rows and two columns) are arranged in a matrix shape (for example, a total of 225 unit detection areas arranged in 15 rows and 15 columns) in the touch pad.

As shown in FIG. 11, a method of computing the in-plane direction component (slipping direction) of the external pressure in a case where a user obliquely presses the upper left location relative to the gravity center of the detection surface of the touch pad with a finger will be considered. In this case, the pressing force (external force) of a finger is applied to a portion arranged in three rows and three columns out of a matrix of 15 rows and 15 columns. Here, the vertical direction pressure component of the external pressure is strongest (110 mV) in the gravity center of the portion receiving the external pressure as in FIG. 10.

Each unit detection area arranged in three rows and three columns has four capacitance detection elements S1 to S4. Differences of the electrostatic capacitance values of each capacitance detection element S1 to S4 obtained by arbitrarily combining the electrostatic capacitance values detected from each capacitance detection element S1 to S4 are calculated, and the direction of the external pressure is calculated based on the differences. That is, for each unit detection area, the X direction component Fx and the Y direction component Fy of the external pressure are calculated based on the aforementioned equations (2) and (3). Here, it is understood that the external pressure is applied in a direction inclined by about 123° with respect to the +X direction. In addition, in order to calculate the direction of the external pressure, a method of using an average value of 9 calculation results or a method of using a maximum value (for example, a detection value higher than a predetermined threshold value) out of 9 calculation results may be used.

In the detection apparatus 1 according to the present embodiment, it is possible to improve a detection precision for the direction of the external pressure using a 2-stage configuration including the elastic projection and the dielectric body in comparison with the detection apparatus disclosed in JP-A-60-135834 and JP-A-7-128163. As the external pressure is applied to the surface of the third substrate 30 along a predetermined direction, the elastic projection 32 is compressively deformed to a certain thickness. As the applied external pressure increases, a critical point at which the elastic projection 32 is not deformed any more is reached. If the external pressure applied to the elastic projection 32 exceeds the critical point, the dielectric body 40 is flexibly deformed. For this reason, it is possible to detect the external pressure having a strength equal to or higher than the critical point at which the elastic projection 32 is allowed to be deformed. In addition, the deformation of the elastic projection 32 is deviated by the external pressure in a predetermined direction. That is, in a case where a slipping force component in a predetermined in-plane direction exists in the external pressure, the gravity center of the elastic projection 32 is deviated from the reference point and moves to a predetermined direction (slipping direction). Then, the thickness of the dielectric body 40 of a portion to which the gravity center of the elastic projection 32 moves is relatively reduced. That is, different electrostatic capacitance values are detected in each capacitance detection element S1 to S4. Specifically, a relatively high electrostatic capacitance is detected from the capacitance detection element in the location overlapping with the gravity center of the elastic projection 32, and a relative low electrostatic capacitance is detected from the capacitance detection element in the location not overlapping with the gravity center of the elastic projection 32. Therefore, differences of the electrostatic capacitances detected from each capacitance detection element S1 to S4 are calculated using a calculation device, and it is possible to obtain the direction and the strength of the external pressure based on the differences. Therefore, it is possible to provide a detection apparatus 1 capable of detecting the direction and the strength of the external pressure with a high precision.

In such a detection apparatus, each capacitance detection element S1 to S4 distinguishably detects a change of the electrostatic capacitance value caused by elastic deformation and a change of the electrostatic capacitance value caused by deformation of the dielectric body 40 of the elastic deformation of the elastic projection 32. Therefore, it is possible to readily detect the external pressure in comparison with a case where they are collectively detected. For example, assuming that the dielectric body is nearly not deformed until the critical point of the elastic projection 32 is reached, it is possible to obtain the direction and the strength of the external pressure just by detecting a change of the electrostatic capacitance value caused by elastic deformation of the elastic deformation of the elastic projection 32. Therefore, it is possible to facilitate calculation of differences of the electrostatic capacitance values of each capacitance detection element S1 to S4, and efficiently detect the external pressure.

In such a configuration, since a plurality of first capacitor electrodes 12 are arranged point-symmetrically with respect to the reference point P, a relationship between a deformation amount of the elastic projection 32 and distances between the reference point P and each first capacitor electrode 12 is made to be equal. For this reason, the electrostatic capacitance values detected from each capacitance detection element S1 to S4, including the respective first and second capacitor electrodes 12 and 22, are made to be equal. For example, in a case where a plurality of first capacitor electrodes are arranged with different distances from the reference point, the electrostatic capacitance values detected from each capacitance detection element S1 to S4 are made to be different even when the deformation amount of the elastic projection 32 is equal. For this reason, when the difference of the detection capacitance is calculated, a correction coefficient is necessary depending on the arrangement location of each first capacitor electrode. However, in the present configuration, since the deformation amount of the elastic projection 32 and the electrostatic capacitance values detected from each capacitance detection element S1 to S4 are made to be equal, the aforementioned correction coefficient is not necessary. Therefore, it is possible to facilitate calculation of the strength and the direction of the external pressure based on the differences of the electrostatic capacitance values of each capacitance detection element S1 to S4, and efficiently detect the external pressure.

In such a configuration, since a plurality of first capacitor electrodes 12 are arranged in a matrix shape along two perpendicular directions, it is possible to facilitate calculation of the strength and the direction of the external pressure based on the differences of the electrostatic capacitance values of each capacitance detection element S1 to 54 by arbitrarily combining the electrostatic capacitance values of each capacitance detection element S1 to 54, each including the respective first and second capacitor electrodes 12 and 22. For example, in a case where the X direction component out of the in-plane direction components is calculated, it is possible to distinguishably select a combination of the capacitance detection elements S2 and S4 relatively arranged in the +X direction and a combination of the capacitance detection elements S1 and S3 relatively arranged in the –X direction, compared to a case where a plurality of first capacitor electrodes 12 are randomly arranged along multiple directions. Therefore, it is possible to efficiently detect the external pressure.

In such a configuration, since the second capacitor electrode 22 is arranged in the second substrate, the electric field applied between the first and second capacitor electrodes 12 and 22 contains a large number of components in a direction parallel to the thickness direction of the dielectric body 40, compared to a case where the first and second capacitor electrodes 12 and 22 are arranged in the same substrate. That is, a vector component of the electric field applied between the first and second capacitor electrodes 12 and 22 becomes nearly equal to the direction of the external pressure. Therefore, it is possible to detect the strength and the direction of the external pressure with a high precision.

In such a configuration, since a plurality of elastic projections 32 are separately arranged, it is possible to allow for a deformation amount in the direction parallel to the in-plane direction of the third substrate mainframe 31 when the elastic projection 32 is elastically deformed. For example, it is possible to suppress one of the elastic projections 32 being affected by the deformation generated in other elastic projections 32. For this reason, it is possible to accurately deliver the external pressure to the dielectric body 40 in comparison with a case where a plurality of elastic projections 32 are arranged to make contact with one another. Therefore, it is possible to detect the strength and the direction of the external pressure with a high precision.

In addition, although a case where a total of four first capacitor electrodes 12 are arranged in two rows and two columns in each unit detection area S has been described by way of example, the invention is not limited thereby. Three of more first capacitor electrodes 12 may be arranged in each unit detection area S.

Second Embodiment

Figure 12:
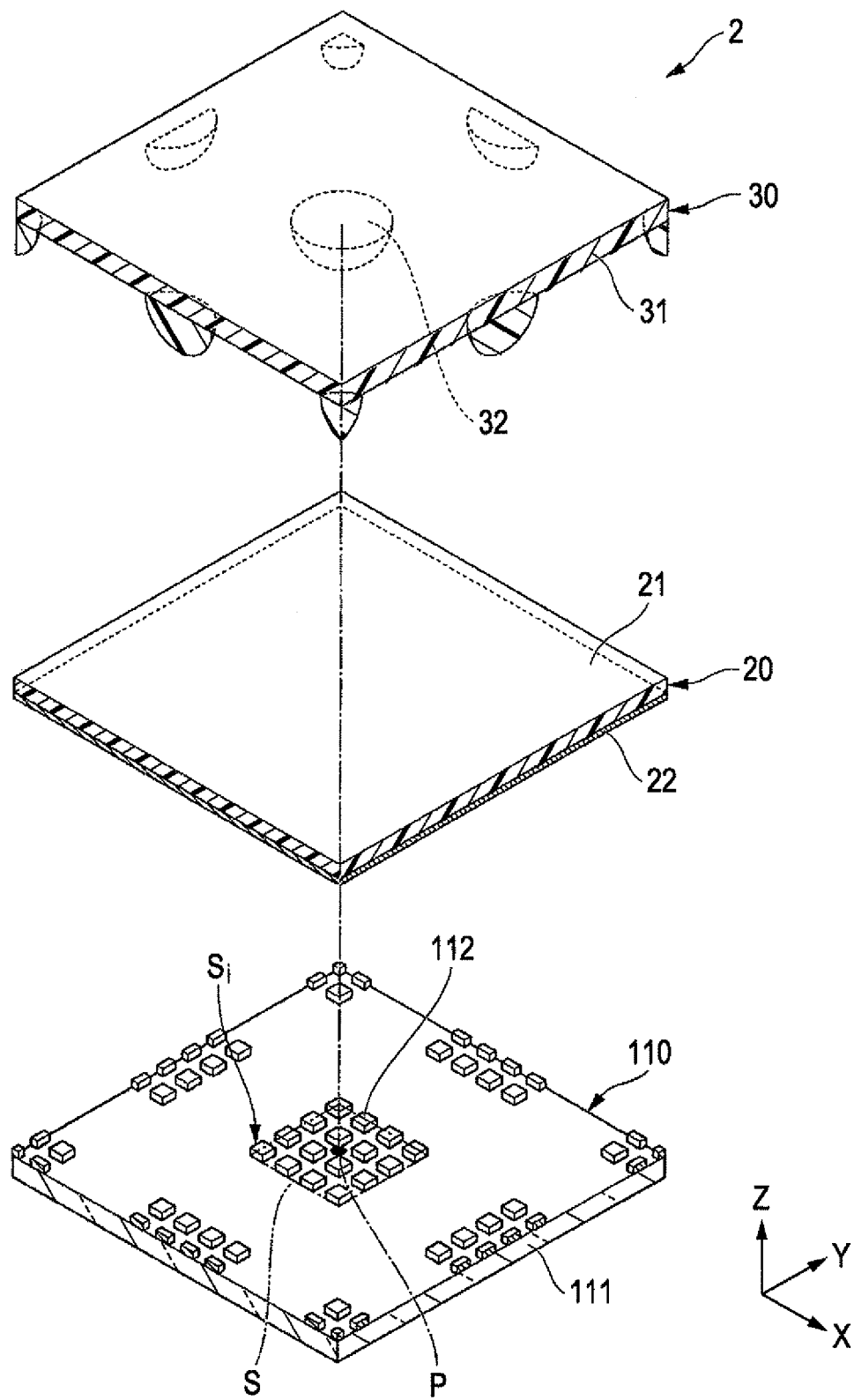
FIG. 12 is an exploded perspective view illustrating a schematic configuration of a detection device according to a second embodiment of the invention.

FIG. 12 is an exploded perspective view illustrating a schematic configuration of the detection device 2 according to a second embodiment of the invention in conjunction with FIG. 1. In FIG. 12, illustration of the dielectric body 40 (refer to FIG. 13) is omitted for the simplicity purpose. In FIG. 12, the reference symbol P denotes a reference point, and the reference symbol S denotes a unit detection area detected by a plurality of capacitance detection elements $S_i$ (including a first capacitor electrode 112, a second capacitor electrode 22, and a dielectric body 40) arranged to match with a single elastic projection 32. The detection device 2 according to the present embodiment is different from the detection device 1 described above in the first embodiment in that a plurality of first capacitor electrodes 112 are arranged in at least four rows and four columns along two perpendicular directions. In FIG. 12, like reference numerals denote like elements as in FIG. 1, and description thereof will be omitted. Although FIG. 12 shows a plurality of first capacitor electrodes 112 arranged in four rows and four columns in each unit detection area S for the simplicity purpose, in practice, a plurality of first capacitor electrodes 112 may be arranged in four or more rows and four or more columns in each unit detection area S as shown in FIGS. 13A to 13C and 14A to 14C.

Referring to FIG. 12, the detection device 2 includes a first substrate 110 having a plurality of first capacitor electrodes 112 arranged in the around of the reference point P, a second substrate 20 arranged to face the first substrate 110 by interposing the first capacitor electrode 112, a dielectric body 40 (refer to FIGS. 13A to 13C) arranged between the first and second substrates 10 and 20, and a third substrate 30 having an elastic projection 32, which has a gravity center positioned in a location overlapping with the reference point P and is deformed by the external pressure while a tip thereof abuts on the second substrate 20.

As a plurality of first capacitor electrode 112, a total of 16 first capacitor electrodes 112 are arranged in at least four rows and four columns along two perpendicular directions (X and Y directions). Specifically, a total of 16 first capacitor electrodes 112 are arranged in at least four rows and four columns in each unit detection area S. The gravity center of the 16 first capacitor electrodes 112 (the gravity center of the unit detection area S) corresponds to the reference point P.

Figure 13A:
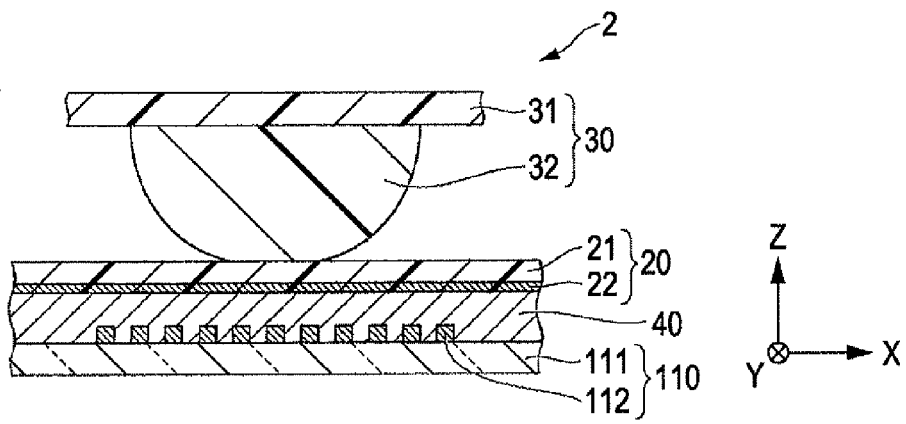
FIGS. 13A to 13C are cross-sectional views illustrating change of an electrostatic capacitance using an electrostatic capacitance according to a second embodiment.
Figure 13B:
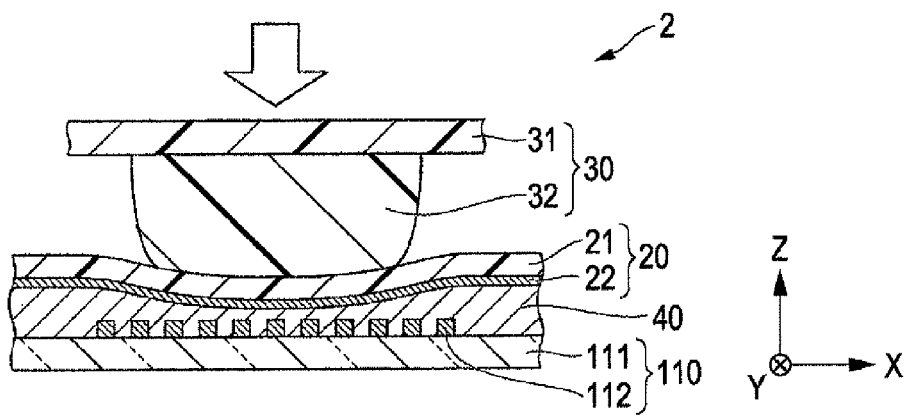
Figure 13C:
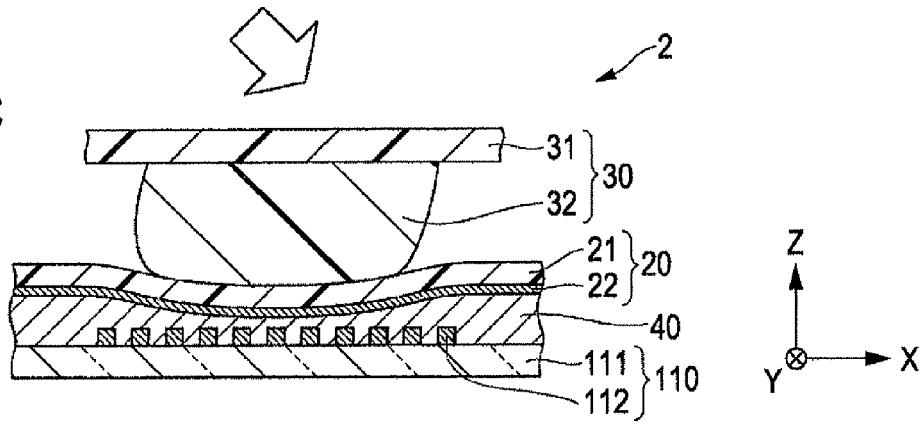
Figure 14A:
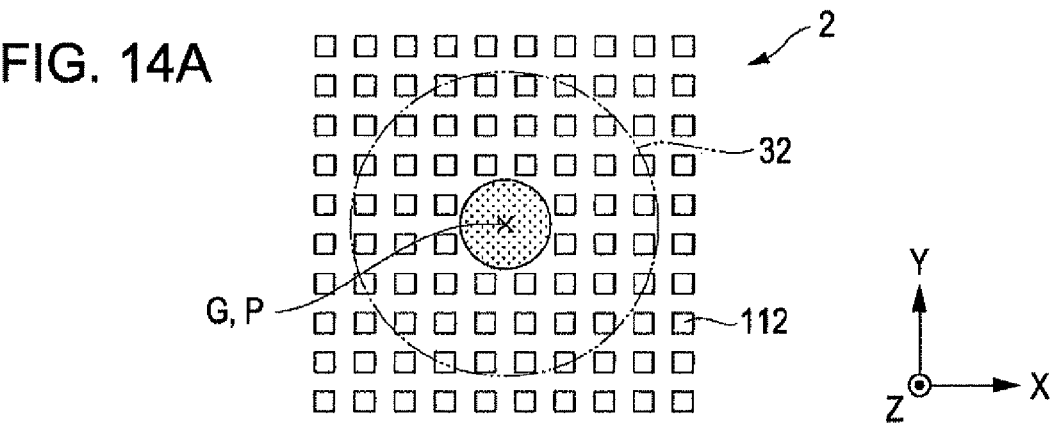
FIGS. 14A to 14C are plan views illustrating change of an electrostatic capacitance using a capacitance detection element according to a second embodiment.
Figure 14B:
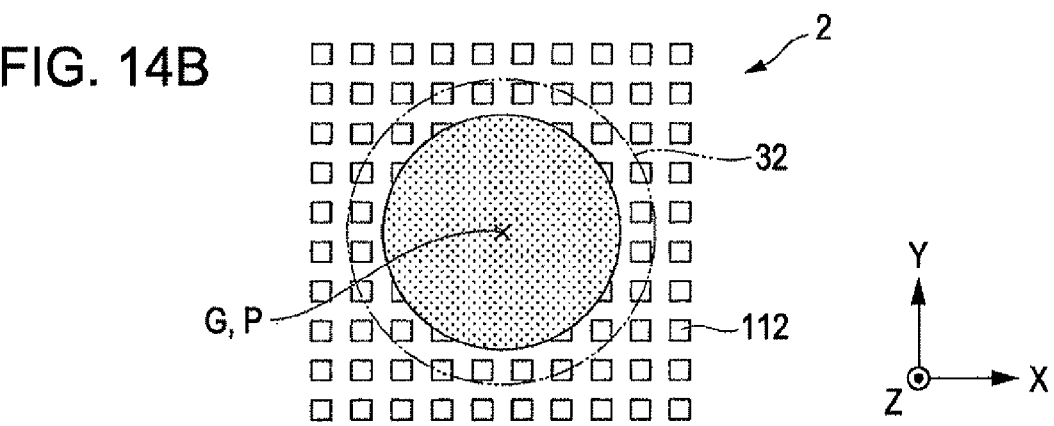
Figure 14C:
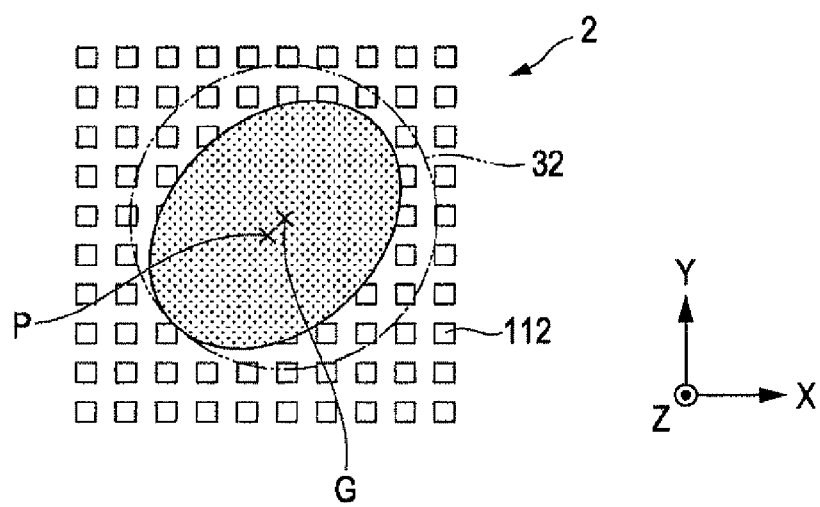

FIGS. 13A to 13C are cross-sectional views illustrating a change of the electrostatic capacitance using the capacitance detection element according to a second embodiment in conjunction with FIGS. 7A to 7C. FIGS. 14A to 14C are plan views illustrating a change of the electrostatic capacitance using the capacitance detection element according to a second embodiment in conjunction with FIGS. 13A to 13C. FIGS. 13A and 14A illustrate a condition before the external pressure is applied to the surface of the third substrate 30 (no external pressure is applied). FIGS. 13B and 14B illustrate a condition that the external pressure is applied to the surface of the third substrate 30 in a vertical direction. FIGS. 13C and 14C illustrate a condition that the external pressure is applied to the surface of the third substrate 30 with an inclination. In FIGS. 14A to 14C, the reference symbol G denotes a gravity center of the elastic projection 32. In FIGS. 13A to 13C and 14A to 14C, like reference symbols denote like elements as in FIGS. 7A to 7C and 8A to 8C, and description thereof will be omitted.

As shown in FIGS. 13A and 14A, the elastic projection 32 is not deformed before the external pressure is applied to the surface of the third substrate 30. As a result, a distance between the first and second capacitor electrodes 112 and 22 is constantly retained. At this moment, the gravity center G of the elastic projection 32 is positioned in a location overlapping with the reference point P. The electrostatic capacitance values of each capacitance detection element $S_i$ at this moment are stored in a memory (not shown). The strength or the direction of the external pressure is obtained based on the electrostatic capacitance values of each capacitance detection element $S_i$ stored in the memory.

As shown in FIGS. 13B and 14B, when the external pressure is applied to the surface of the third substrate 30 in a vertical direction, the elastic projection 32 is compressively deformed in the Z direction while a tip thereof abuts on the surface of the second substrate 20. As a result, the second substrate 20 is bent in the −Z direction, and a distance between the first and second capacitor electrode 112 and 22 is reduced in comparison with a case where no external pressure is applied. That is, the electrostatic capacitance value of the capacitance detection element at this moment increases in comparison with a case where no external pressure is applied.

As shown in FIGS. 13C and 14C, when the external pressure is obliquely applied to the surface of the third substrate 30, the elastic projection 32 is compressively deformed with an inclination while a tip thereof abuts on the surface of the second substrate 20. As a result, the second substrate 20 is bent in the −Z direction, and a distance between the first and second capacitor electrode 12 and 22 is reduced in comparison with a case where no external pressure is applied. In addition, the +X direction component of the bending amount of the second substrate 20 is larger than −X direction component thereof. At this moment, the gravity center G of the elastic projection 32 is deviated from the reference point P in the +X and +Y directions. In this case, comparing a ratio of the overlapping areas between the tip of the elastic projection 32 and a plurality of first capacitor electrodes 112, a ratio of the area overlapping with the portions arranged in the +X and +Y directions is larger than a ratio of the area overlapping with the portions arranged in the −X and −Y directions.

Figure 15:
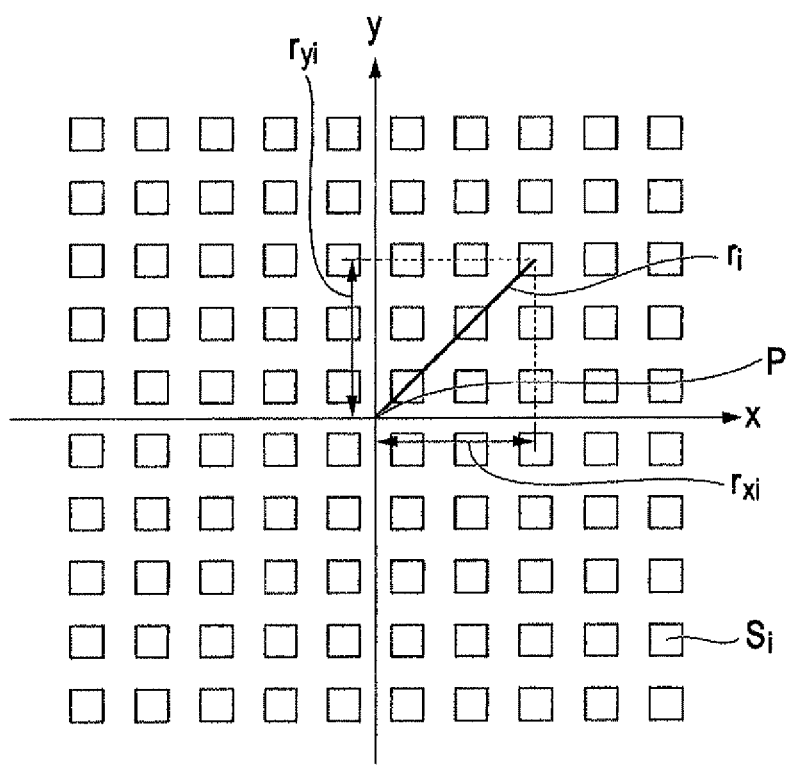
FIG. 15 is a diagram illustrating a coordinate system of a sensing area according to a second embodiment.

FIG. 15 is a diagram illustrating a coordinate system of the sensing area according to a second embodiment in conjunction with FIG. 9. In FIG. 15, a plurality of capacitance detection elements $S_i$ (100 elements) are arranged in a matrix shape, and each 25 capacitance detection elements $S_i$ are arranged in the area partitioned in the −X and +Y directions, the area partitioned in the +X and +Y directions, the area partitioned in the −X and −Y directions, and the area partitioned in the +X and −Y directions. Although hundred capacitance detection elements $S_i$ are illustrated in FIG. 15 for the simplicity purpose, the arrangement number of the capacitance detection elements $S_i$ is not limited thereto, and may be arbitrarily modified.

As shown in FIG. 15, as a plurality of capacitance detection elements $S_i$, a total of hundred capacitance detection elements are arranged in ten rows and ten columns in each unit detection area S. Here, the electrostatic capacitance values (detection value) detected from each capacitance detection element $S_i$ are denoted by $P_i$ (i=1 to 100), and the in-plane direction components of the distance between the reference point P and each first capacitor electrode 112 are denoted by $r_i$ (i=1 to 100). In addition, assuming that the X direction component of the in-plane direction components is denoted by $r_{xi}$ (i=1 to 100), and the Y direction component of the in-plane direction components is denoted by $r_{yi}$ (i=1 to 100), the X direction component Fx of the external force (a ratio of the force component applied in the X direction out of the in-plane direction components of the external force) can be expressed as the following equation (5).

[Equation 5]

$$F_x = \frac{\sum_i P_i r_{xi}}{\sum_i P_i} \tag{5}$$

In addition, the Y direction component Fy of the external force (a ratio of the force component applied in the Y direction out of the in-plane direction components of the external force) can be expressed as the following equation (6).

[Equation 6]

$$F_y = \frac{\sum_i P_i r_{yi}}{\sum_i P_i} \tag{6}$$

In addition, the Z direction component $F_z$ of the external force (the vertical direction component of the external force) can be expressed as the following equation (7).

[Equation 7]

$$F_z = \sum_i P_i \tag{7}$$

In the present embodiment, differences of the electrostatic capacitance values of each capacitance detection element $S_i$ obtained by arbitrarily combining the electrostatic capacitance values of the hundred capacitance detection elements $S_i$, that change depending on the elastic deformation of the elastic projection caused by an external pressure, are calculated, and the direction of the external pressure is calculated based on the differences.

As shown in equation (5), for the X direction component $F_x$ of the external pressure, the capacitance detection elements $S_i$ arranged relatively in the +X direction are combined out of the electrostatic capacitance values of the hundred capacitance detection elements $S_i$, and the capacitance detection elements $S_i$ arranged relatively in the −X direction are combined. In this manner, the X direction component of the external pressure is obtained based on differences between the electrostatic capacitance value obtained by combining the capacitance detection elements $S_i$ arranged relatively in the +X direction and the electrostatic capacitance value obtained by combining the capacitance detection elements $S_i$ arranged relatively in the −X direction.

As shown in equation (6), for the Y direction component $F_y$ of the external pressure, the capacitance detection elements $S_i$ arranged relatively in the +Y direction out of the electrostatic capacitance values of the hundred capacitance detection elements $S_i$ are combined, and the capacitance detection elements $S_i$ arranged relatively in the −Y direction are combined. In this manner, the Y direction component of the external pressure is obtained based on the differences between the electrostatic capacitance value obtained by combining the capacitance detection elements $S_i$ arranged relatively in the +Y direction and the electrostatic capacitance value obtained by combining the capacitance detection elements $S_i$ arranged relatively in the −Y direction.

As shown in equation (7), the Z direction component $F_z$ of the external pressure is obtained using a resultant force obtained by adding the electrostatic capacitance values of hundred capacitance detection elements $S_i$. However, the detection value of the Z direction component Fz of the external pressure tends to increase in comparison with the X direction component Fx of the external pressure and the Y direction component Fy of the external pressure. For this reason, in order to match the detection value of the Z direction component Fz of the external pressure with the detection values of the X direction component Fx and the Y direction component Fy of the external pressure, it is necessary to properly correct the detection value using a correction coefficient determined based on a material or a shape of the elastic projection 32.

In addition, in order to calculate the direction of the external pressure, a method of using an average value of the calculation results of the electrostatic capacitance values of hundred capacitance detection elements $S_i$, or a method of using a maximum value (for example, a detection value higher than a predetermined threshold value) out of the calculation results of the electrostatic capacitance values of the hundred capacitance detection elements $S_i$ may be used.

In the detection device 2 according to the present embodiment, since a plurality of first capacitor electrodes 112 are arranged in at least four rows and four columns along two perpendicular directions, a large number of first capacitor electrodes 112 can be arranged. For this reason, it is possible to obtain the strength and the direction of the external pressure by integrating detection results for each capacitance detection element $S_i$ based on the electrostatic capacitances detected from a plurality of capacitance detection elements $S_i$. Therefore, it is possible to detect the strength and the direction of the external pressure with a high precision.

Third Embodiment

Figure 16:
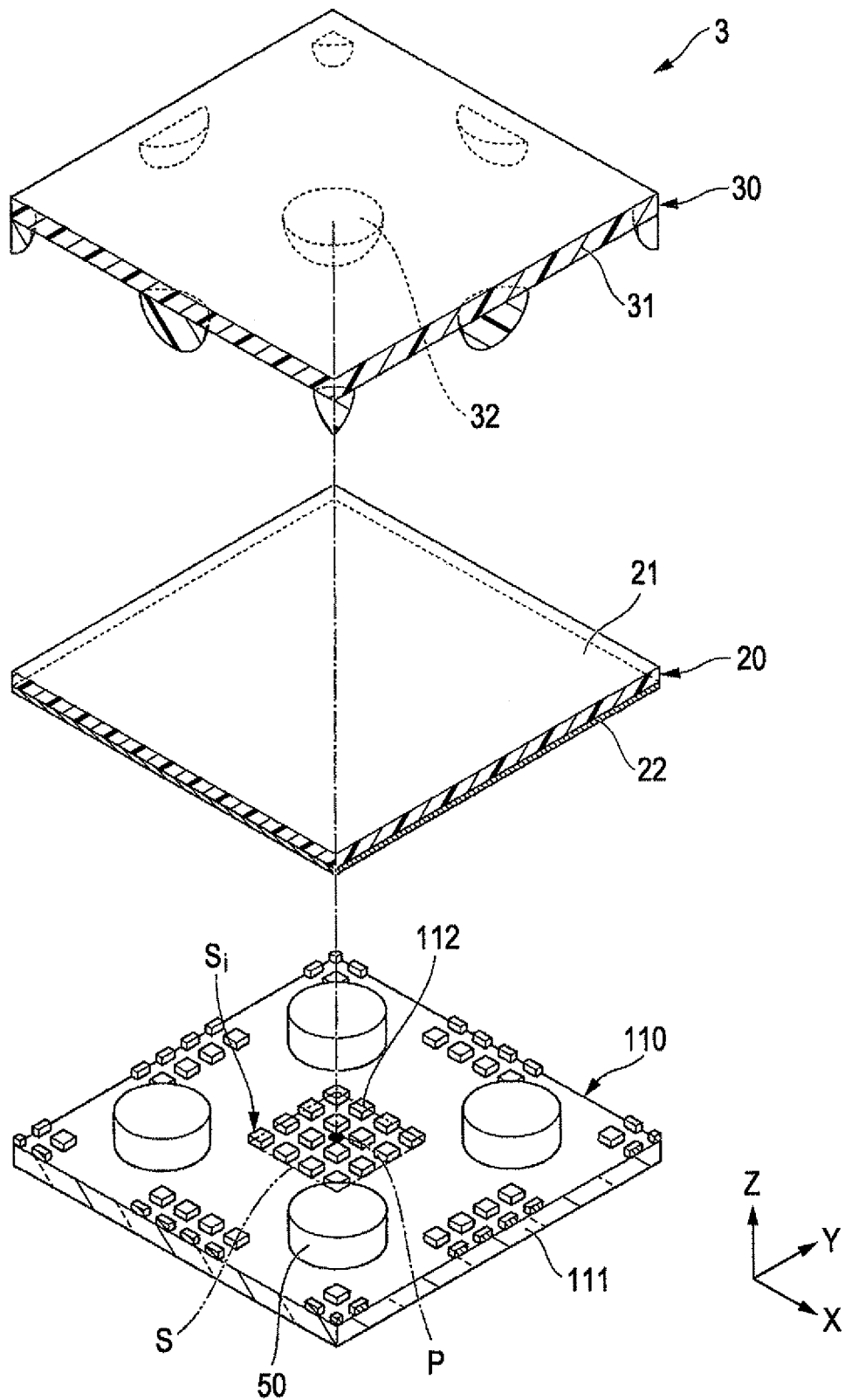
FIG. 16 is an exploded perspective view illustrating a schematic configuration of a detection device according to a third embodiment of the invention.

FIG. 16 is an exploded perspective view illustrating a schematic configuration of a detection device 3 according to a third embodiment of the invention in conjunction with FIG. 12. In FIG. 16, illustration of the dielectric body 40 (refer to FIGS. 17A to 17C) will be omitted for the simplicity purpose. In addition, in FIG. 16, the reference symbol P denotes a reference point, and the reference symbol S denotes a unit detection area detected by a plurality of capacitance detection elements $S_i$ (including a first capacitor electrode 112, a second capacitor electrode 22, and a dielectric body 40) arranged to match with a single elastic projection 32. The detection device 3 according to the present embodiment is different from the detection device 2 described above in the second embodiment in that a spacer 50 is arranged in at least a boundary with the adjacent elastic projection 32 between the first and second substrates 110 and 20. In FIG. 16, like reference numerals denote like elements as in FIG. 12, and description thereof will be omitted.

As shown in FIG. 16, the detection device 3 includes a first substrate 110 having a plurality of first capacitor electrodes 112 arranged in the around of a reference point P, a second substrate 20 arranged to face the first substrate 110 by interposing the first capacitor electrodes 112, a dielectric body 40 (refer to FIG. 13A to 13C) interposed between the first and second substrates 10 and 20, a third substrate 30 having an elastic projection 32 which has a gravity center positioned in a location overlapping with the reference point P and is elastically deformed by the external pressure while a tip thereof abuts on the second substrate 20, and a spacer 50 arranged in at least a boundary with an adjacent elastic projection 32 between the first and second substrates 110 and 20.

The spacer 50 has a cylindrical shape and is arranged in a boundary with an adjacent elastic projection 32. The spacer 50 may be arranged in an intersecting area of the aforementioned boundary or may be arranged across the entire boundary of the unit detection area S, for example, in a frame shape capable of burying the entire boundary described above. Here, the spacer 50 is arranged in an intersecting area of the aforementioned boundary. That is, the spacer 50 is arranged in four corners of the unit detection area S.

Figure 17A:
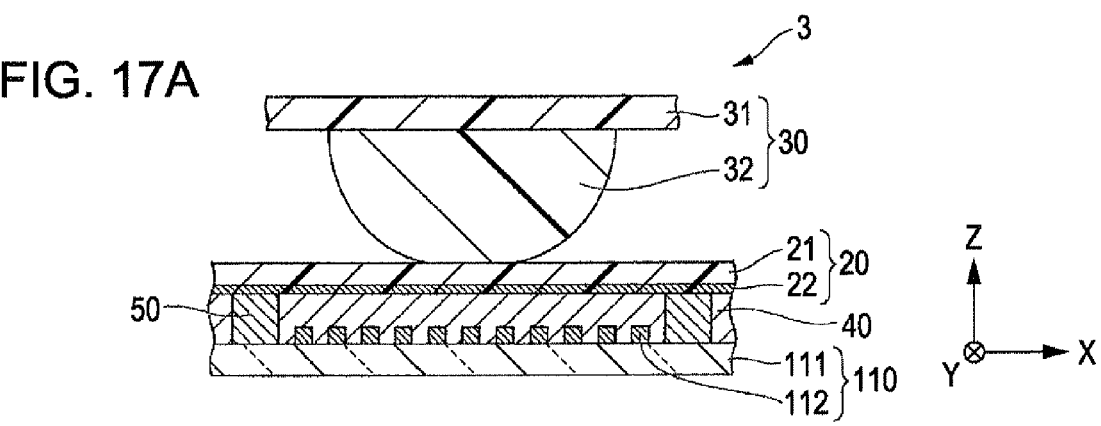
FIGS. 17A to 17C are cross-sectional views illustrating change of an electrostatic capacitance using a capacitance detection element according to a third embodiment.
Figure 17B:
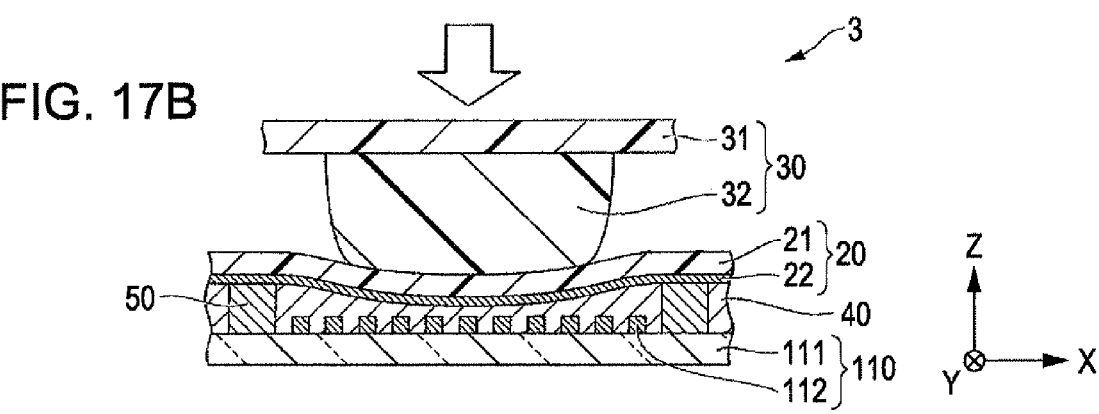
Figure 17C:
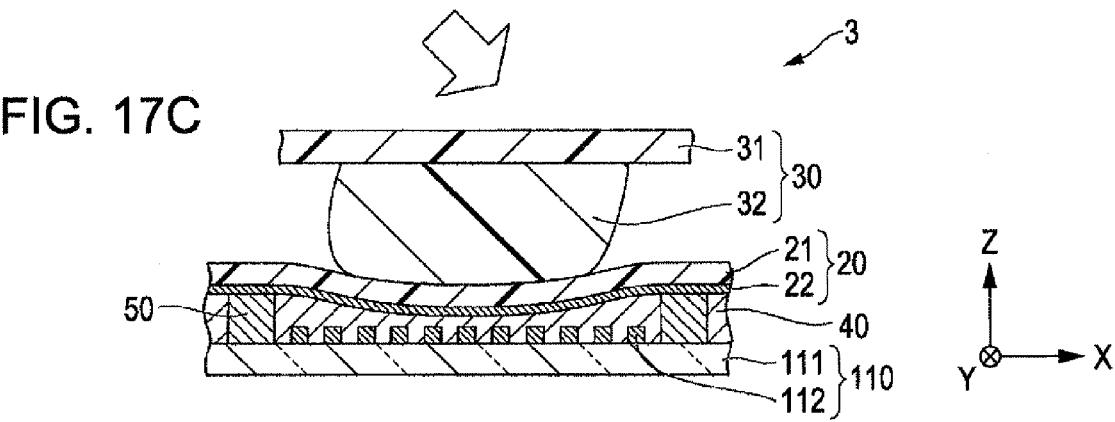

FIGS. 17A to 17C are cross-sectional views illustrating a change of the electrostatic capacitance using the capacitance detection element according to a third embodiment in conjunction with FIGS. 13A to 13C. In addition, FIG. 17A shows a condition before the external pressure is applied to the surface of the third substrate 30 (when no external pressure is applied). FIG. 17B shows a condition that the external pressure is applied to the surface of the third substrate 30 in a vertical direction. FIG. 17C shows a condition that the external pressure is obliquely applied to the surface of the third substrate 30. In FIGS. 17A to 17C, like reference numerals denote like elements as in FIGS. 13A to 13C, and description thereof will be omitted.

As shown in FIG. 17A, before the external pressure is applied to the surface of the third substrate 30, the elastic projection 32 is not deformed. As a result, a distance between the first and second capacitor electrodes 112 and 22 is constantly retained. The electrostatic capacitance values of each capacitance detection element $S_i$ at this moment are stored in a memory (not shown). The strength or the direction of the external pressure is obtained based on the electrostatic capacitance values of each capacitance detection element $S_i$ stored in the memory.

As shown in FIG. 17B, when the external pressure is applied to the surface of the third substrate 30 in a vertical direction, the elastic projection 32 is compressively deformed in the Z direction while a tip thereof abuts on the surface of the second substrate 20. As a result, the second substrate 20 is bent in the −Z direction, and the distance between the first and second capacitor electrodes 112 and 22 is reduced in comparison with a case where no external pressure is applied. That is, the electrostatic capacitance value of the capacitance detection element at this moment increases in comparison with a case where not external pressure is applied.

However, it is known that, if the spacers are arranged with a narrower distance than the area obtained when the elastic projection is compressively deformed, irregular detection values may easily occur in a portion of the substrate susceptible to the bending and a portion of the substrate not susceptible to the bending (a bending strength). In the present embodiment, the spacers 50 are arranged with a wider distance than the area obtained when the elastic projection is compressively deformed. For this reason, the bending of the second substrate 20 occurs in the area surrounded by the spacers 50. That is, the external pressure is applied to each unit detection area partitioned by the spacer 50. For example, in a case where a user presses the detection device 3 with a finger in a vertical direction, it is possible to suppress the external pressure in a vertical direction from being detected in somewhere other than the pressed point.

As shown in FIG. 17C, when the external pressure is obliquely applied to the surface of the third substrate 30, the elastic projection 32 is compressively deformed with an inclination while a tip thereof abuts on the surface of the second substrate 20. As a result, the second substrate 20 is bent in the −Z direction, and a distance between the first and second capacitor electrodes 12 and 22 is reduced in comparison with a case where no external pressure is applied. In addition, the +X direction component of the bending amount of the second substrate 20 is larger than the −X direction component thereof. At this moment, the gravity center G of the elastic projection 32 is deviated from the reference point P in the +X and +Y directions.

The bending of the second substrate 20 occurs in the area surrounded by the spacers 50. That is, the external pressure is applied to each unit detection area partitioned by the spacers 50. For example, in a case where a user obliquely presses the detection device 3 with a finger, it is possible to suppress the external pressure in an oblique direction from being detected in somewhere other than the pressed point. In addition, since the second substrate 20 is fixed using the spacer 50, it is possible to suppress the second substrate 20 from being slidingly moved when the external force is applied.

In the detection device 3 according to the present embodiment, since the spacers 50 are arranged at least in a boundary with an adjacent elastic projection 32 between the first and second substrates 110 and 20, the external pressure is applied to each unit detection area surrounded by the spacer 50. For this reason, in the unit detection area surrounded by the spacers 50, it is possible to independently detect the external pressure without being influenced by other unit detection areas. Therefore, it is possible to detect the strength and the direction of the external pressure with a high precision.

Fourth Embodiment

Figure 18:
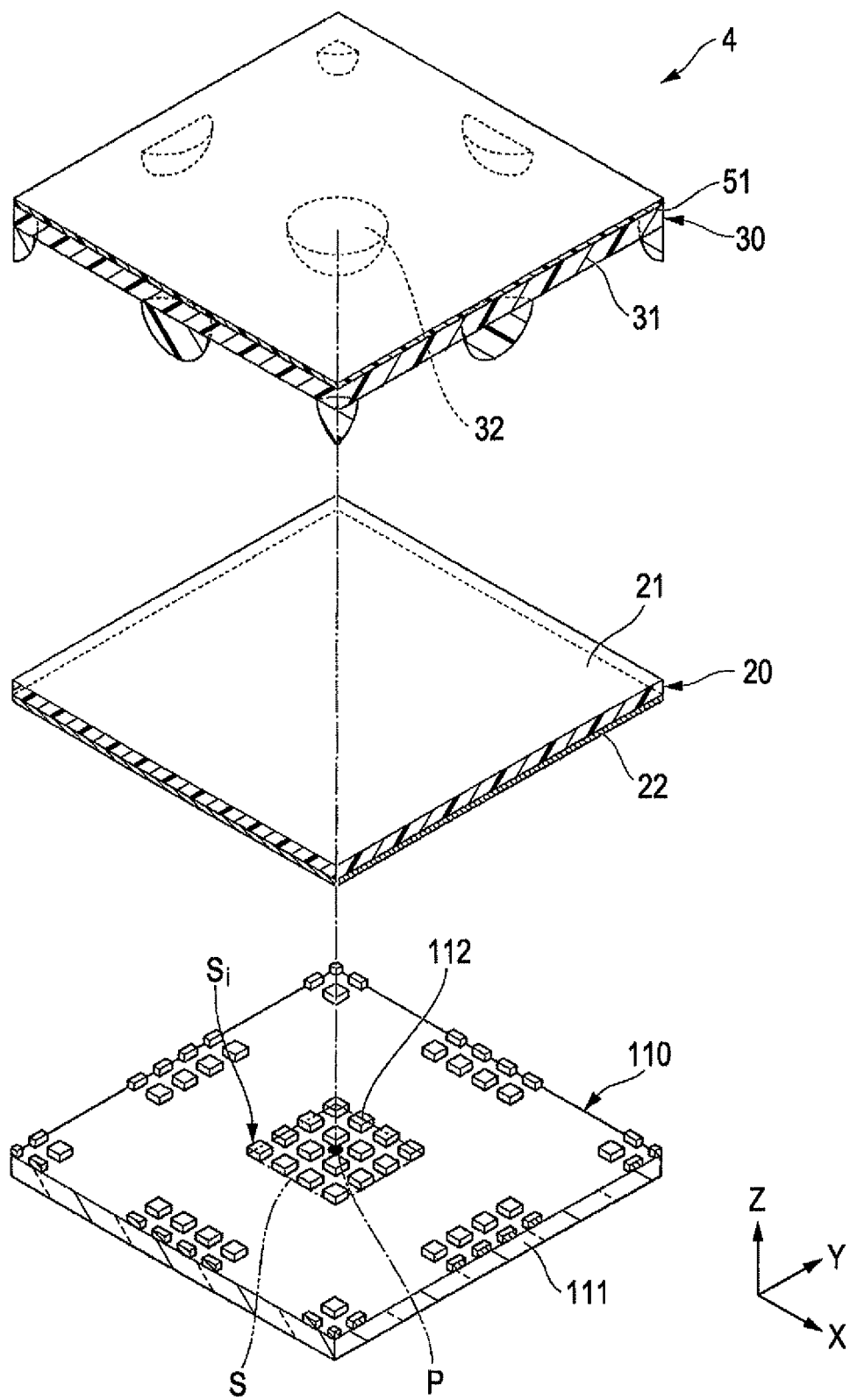
FIG. 18 is an exploded perspective view illustrating a schematic configuration of a detection device according to a fourth embodiment of the invention.

FIG. 18 is an exploded perspective view illustrating a schematic configuration of the detection device 4 according to a fourth embodiment of the invention in conjunction with FIG. 12. In FIG. 18, illustration of the dielectric body 40 (refer to FIG. 19) is omitted for the simplicity purpose. In FIG. 18, the reference symbol P denotes a reference point, and the reference symbol S denotes a unit detection area detected by a plurality of capacitance detection elements $S_i$ (including a first capacitor electrode 112, a second capacitor electrode 22, and a dielectric body 40) arranged to match with a single elastic projection 32. The detection device 4 according to the present embodiment is different from the detection device 2 described in the second embodiment in that a reinforcing member 51 having stiffness higher than that of the third substrate mainframe 31 on the surface of the third substrate 30 is arranged. In FIG. 18, like reference numerals denote like elements as in FIG. 12, and description thereof will be omitted.

As shown in FIG. 18, the detection device 4 includes a first substrate 110 having a plurality of first capacitor electrodes 112 arranged in the around of the reference point P, a second substrate 20 arranged to face the first substrate 110 by interposing the first capacitor electrode 112, a dielectric body 40 (refer to FIG. 19) arranged between the first and second substrates 110 and 20, a third substrate 30 having an elastic projection 32 which has a gravity center positioned in a location overlapping with the reference point P and is elastically deformed by the external pressure while a tip thereof abuts on the second substrate 20, and a reinforcing member 51 arranged opposite to the elastic projection 32 of the third substrate 30.

The reinforcing member 51 is formed to have a rectangular panel shape and the same size as that of the third substrate mainframe 31 as seen in a plan view. The reinforcing member 51 has stiffness higher than that of the third substrate mainframe 31. For example, in a case where the third substrate mainframe 31 is made of foamed urethane resin (durometer hardness: about 30) as in the elastic projection 32, the reinforcing member 51 may be formed of epoxy resin or urethane resin (durometer hardness: about 60). For this reason, even when the external force is applied to the contact surface by a target object (for example, sharpened stylus pen) smaller than an arrangement interval of the elastic projections 32, it is possible to accurately detect the external pressure.

Figure 19A:
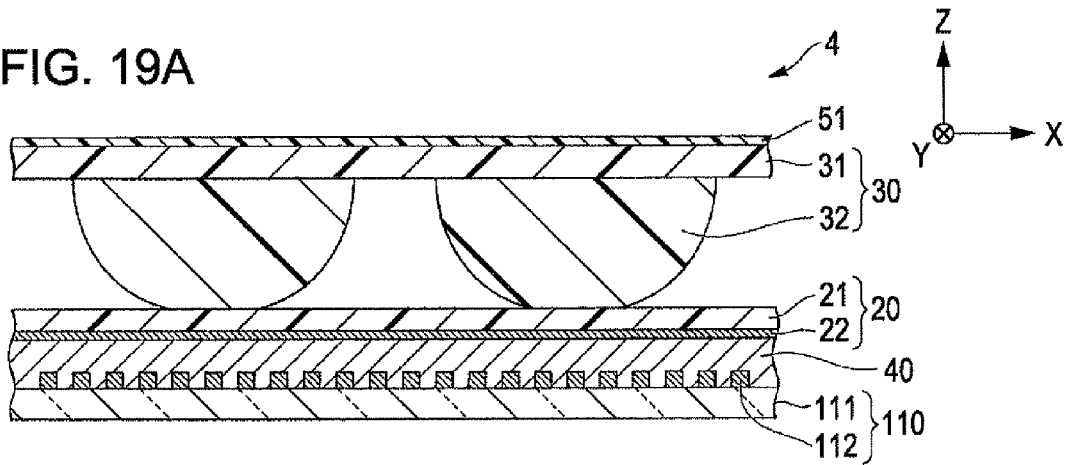
FIGS. 19A to 19C are cross-sectional views illustrating change of an electrostatic capacitance using a capacitance detection element according to a fourth embodiment.
Figure 19B:
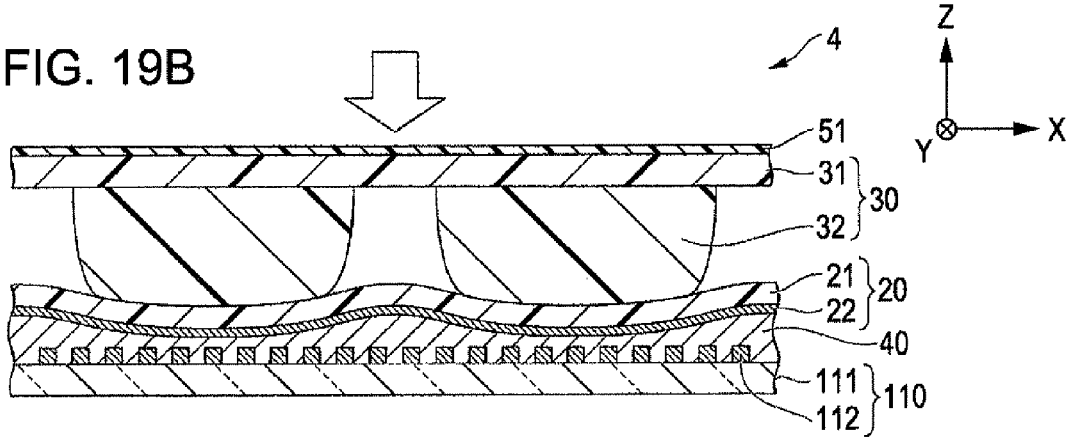
Figure 19C:
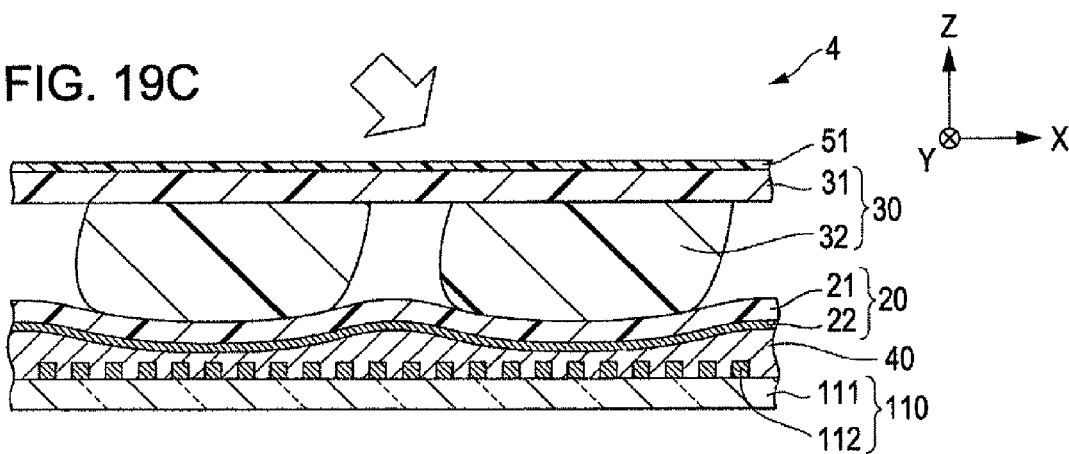

FIGS. 19A to 19C are cross-sectional views illustrating a change of the electrostatic capacitance using the capacitance detection element according to a fourth embodiment in conjunction with FIGS. 13A to 13C. In addition, FIG. 19A illustrates a condition before the external pressure is applied to the surface of the third substrate 30 (the surface of the reinforcing member 51) (when no external pressure is applied). FIG. 19B illustrates a condition that the external pressure is applied to the surface of the third substrate 30 in a vertical direction. FIG. 19C illustrates a condition that the external pressure is obliquely applied to the surface of the third substrate 30. In FIG. 19, like reference numerals denote like elements as in FIG. 13, and description thereof will be omitted.

As shown in FIG. 19A, before the external pressure is applied to the surface of the third substrate 30, the elastic projection 32 is not deformed. As a result, a distance between the first and second capacitor electrodes 112 and 22 is constantly retained. The electrostatic capacitance values of each capacitance detection element $S_i$ at this moment are stored in a memory (not shown). The strength or the direction of the external pressure is obtained by based on the electrostatic capacitance values of each capacitance detection element $S_i$ stored in the memory.

As shown in FIG. 19B, when the external pressure is applied to the surface of the third substrate 30 in a vertical direction, the elastic projection 32 is compressively deformed in the Z direction while a tip thereof abuts on the surface of the second substrate 20. As a result, the second substrate 20 is bent in the −Z direction, and the distance between the first and second capacitor electrodes 112 and 22 is reduced in comparison with a case where no external pressure is applied. That is, the electrostatic capacitance value of the capacitance detection element at this moment increases in comparison with a case where no external pressure is applied.

In addition, the external pressure is applied to the area between two neighboring elastic projections 32. In the present embodiment, since the reinforcing member 51 having stiffness higher than that of the third substrate mainframe 31 is provided on the surface of the third substrate 30, the two neighboring elastic projections 32 are compressively and mutually deformed in a vertical direction to each other, for example, when a user presses the detection device 4 in a vertical direction with a finger. In this manner, it is possible to suppress the two neighboring elastic projections 32 from being compressively deformed by the external force in an opposite direction to each other, compared to the case where the reinforcing member 51 is not provided.

As shown in FIG. 19C, when the external pressure is obliquely applied to the surface of the third substrate 30, the elastic projection 32 is compressively deformed with an inclination while a tip thereof abuts on the surface of the second substrate 20. As a result, the second substrate 20 is bent in the −Z direction, and the distance between the first and second capacitor electrodes 12 and 22 is reduced in comparison with a case where no external pressure is applied. In addition, the +X direction component of the bending amount of the second substrate 20 is larger than the −X direction component thereof. In this case, the gravity center G of the elastic projection 32 is deviated from the reference point P to the +X and +Y directions.

In addition, the external pressure is applied to the area between the two neighboring elastic projections 32. In the present embodiment, since the reinforcing member 51 having stiffness higher than that of the third substrate mainframe 31 is provided on the surface of the third substrate 30, the two neighboring elastic projections 32 are compressively deformed with an inclination to each other, for example, when a user obliquely presses the detection device 4 with a finger. In this manner, it is possible to suppress the two neighboring elastic projections 32 from being compressively deformed by the external force in an opposite direction to each other in comparison with a case where there is no reinforcing member 51.

In the detection device 4 according to the present embodiment, since the reinforcing member 51 having stiffness higher than that of the third substrate mainframe 31 is arranged in the opposite side to the elastic projection 32 of the third substrate 30, it is possible to detect the direction of the external pressure with a high precision. For example, in a case where the external pressure is applied to the area between the two neighboring elastic projections 32, it is possible to suppress the two neighboring elastic projections 32 from being compressively deformed in an opposite direction to each other in comparison with a case where there is no reinforcing member. That is, it is possible to suppress erroneous detection in which the direction of the external pressure is oppositely detected. Therefore, it is possible to detect the strength and the direction of the external pressure with a high precision.

Although the reinforcing member 51 is arranged on the surface of the third substrate 30 in the present embodiment, the invention is not limited thereby. For example, the third substrate mainframe 31 may be formed of a material having stiffness higher than that of the elastic projection 32 without preparing the reinforcing member 51. As a result, it is possible to obtain a low profile of the device in comparison with a configuration having the reinforcing member 51.

Although description has been made in the present embodiment by exemplifying a vertical electric field type in which a first capacitor electrode is arranged in the first substrate and a second capacitor electrode is arranged in the second substrate, and an electric field is applied to the dielectric body between the first and second capacitor electrodes in a vertical direction (Z direction), the invention is not limited thereby. Hereinafter, another detection device 5 different from those of the aforementioned embodiments will be described with reference to FIG. 20.

Fifth Embodiment

Figure 20:
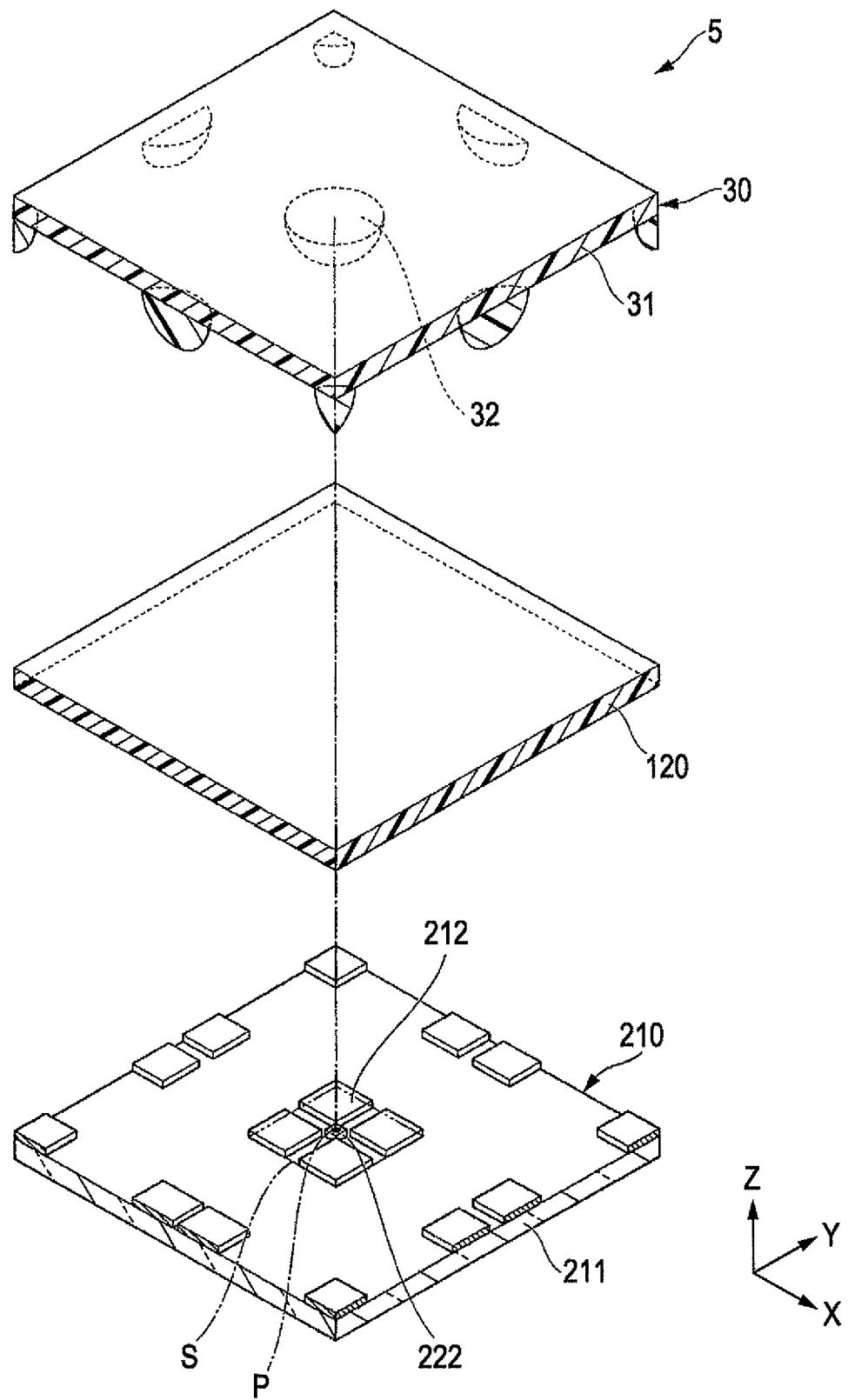
FIG. 20 is an exploded perspective view illustrating a schematic configuration of a detection device according to a fifth embodiment of the invention.

FIG. 20 is an exploded perspective view illustrating a schematic configuration of the detection device 5 according to a fifth embodiment of the invention in conjunction with FIG. 1. In FIG. 20, illustration of the dielectric body 40 (refer to FIG. 21) is omitted for the simplicity purpose. In FIG. 20, the reference symbol P denotes a reference point, and the reference symbol S denotes a unit detection area detected by a plurality of capacitance detection elements (including a first capacitor electrode 212, a second capacitor electrode 222, and a dielectric body 40) arranged to match with a single elastic projection 32. The detection device 5 according to the present embodiment is different from the detection device 1 described in the first embodiment in that the second capacitor electrode 222 is positioned in a location overlapping with the reference point P of the first substrate 210. In FIG. 20, like reference numerals denote like elements as in FIG. 1, and description thereof will be omitted.

As shown in FIG. 20, the detection device 5 includes a first substrate 210 having a plurality of first capacitor electrodes 212 arranged in the around of the reference point P and a second capacitor electrode 222 arranged in a location overlapping with the reference point P, a second substrate 120 arranged to face the first substrate 210 by interposing the first capacitor electrode 212, a dielectric body 40 (refer to FIG. 21) arranged between the first and second substrates 210 and 120, and a third substrate 30 having an elastic projection 32 which has a gravity center positioned in a location overlapping with the reference point P and is compressively deformed by the external pressure while a tip thereof abuts on the second substrate 120.

In the present embodiment, the first substrate 210 is provided with a first capacitor electrode 212 and a second capacitor electrode 222. That is, a horizontal electric field type is employed, in which an electric field is applied to the dielectric body between the first capacitor electrode 212 and the second capacitor electrode 222 in a horizontal direction (X and Y directions).

In addition, the second substrate 120 is a single panel, and such an electrode employed in the vertical electric field type is not formed. For example, if the second substrate 120 is formed of a resin material such as plastic as a molding material, and the electrode is formed through deposition, sputtering, and the like, warping or the like may occur in the second substrate during a heating process of the manufacturing process. However, in this configuration, since it is not necessary to form the electrode in the second substrate 120, it is possible to suppress warping or the like in the second substrate 120 during the manufacturing process.

In addition, the second capacitor electrode 222 is arranged to have an equal interval with a plurality of first capacitor electrode 212. Specifically, as a plurality of first capacitor electrodes 212, a total of four first capacitor electrodes are arranged in two rows and two columns each unit detection area S. The gravity center of four first capacitor electrodes 212 (the gravity center of the unit detection area S) serves as a reference point P, and the second capacitor electrode 222 is arranged in the reference point P.

Figure 21A:
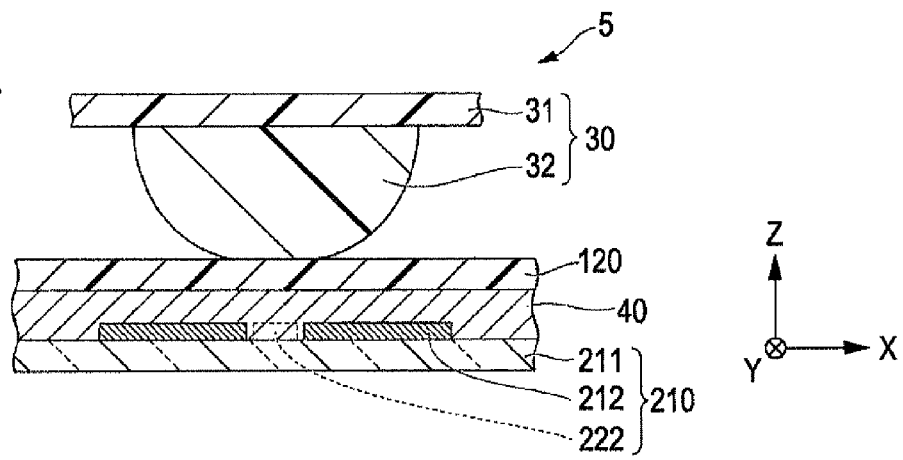
FIGS. 21A to 21C are cross-sectional views illustrating change of an electrostatic capacitance using a capacitance detection element according to a fifth embodiment.
Figure 21B:
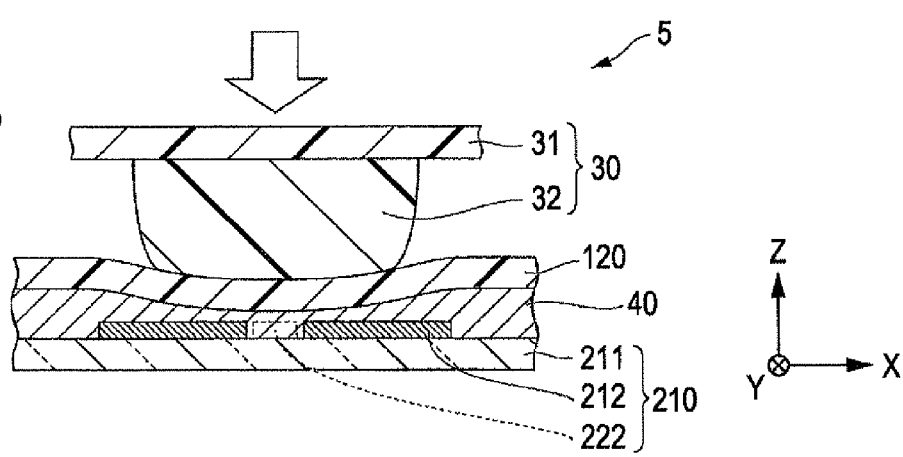
Figure 21C:
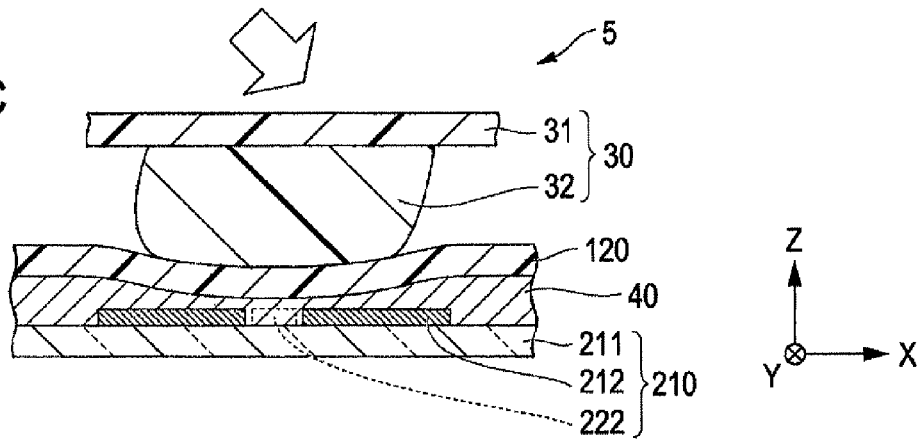
Figure 22A:
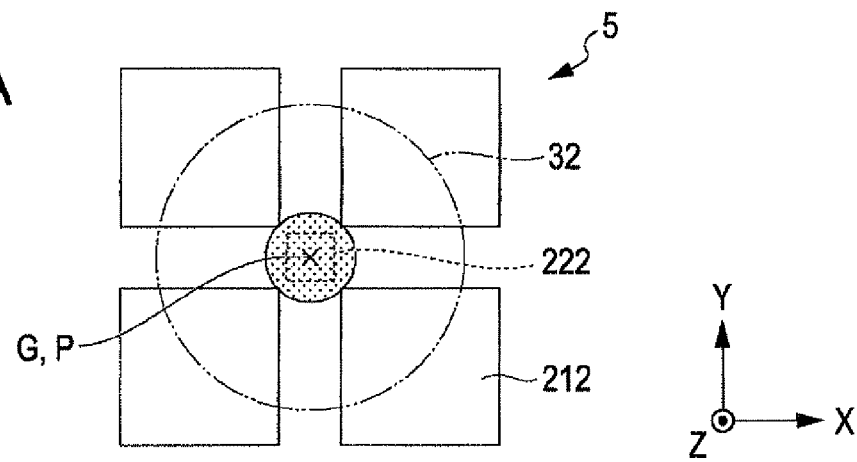
FIGS. 22A to 22C are plan views illustrating change of an electrostatic capacitance using a capacitance detection element according to a fifth embodiment.
Figure 22B:
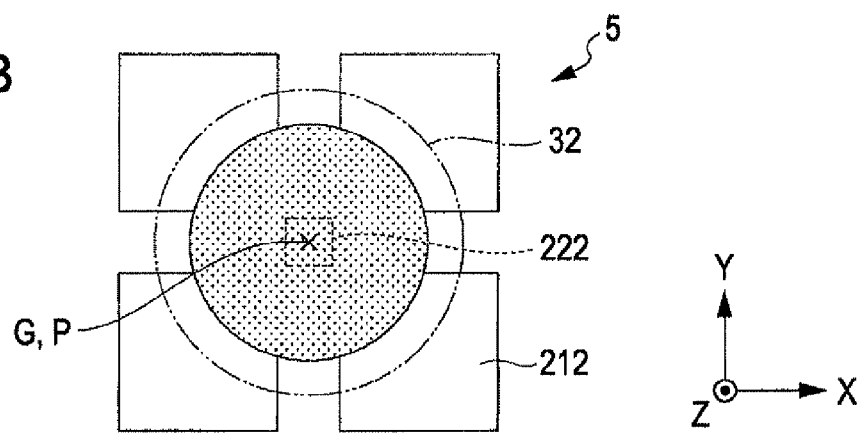
Figure 22C:
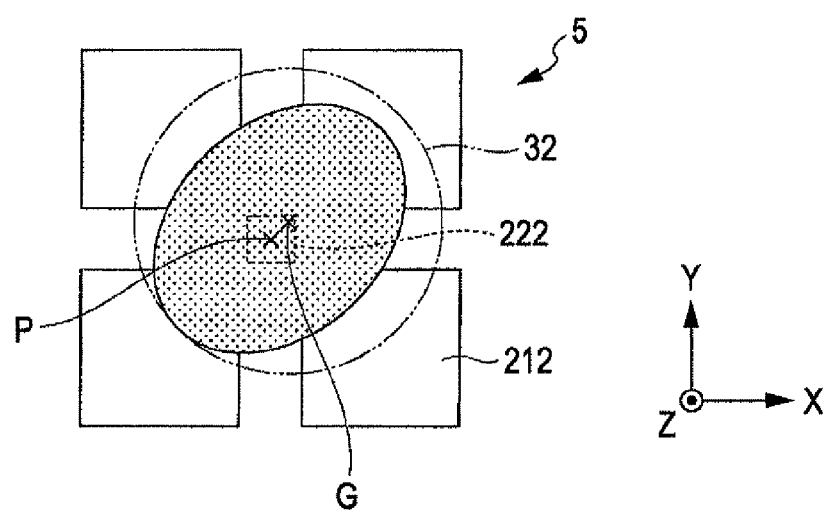

FIGS. 21A to 21C are cross-sectional views illustrating a change of the electrostatic capacitance using the capacitance detection element according to a fifth embodiment in conjunction with FIGS. 7A to 7C. FIGS. 22A to 22C are plan views illustrating a change of the electrostatic capacitance using the capacitance detection element according to a fifth embodiment in conjunction with FIGS. 21A to 21C. In addition, FIGS. 21A and 22A shows a condition before the external pressure is applied to the surface of the third substrate 30 (when no external pressure is applied). FIGS. 21B and 22B shows a condition that the external pressure is applied to the surface of the third substrate 30 in a vertical direction. FIGS. 21C and 22C shows a condition that the external pressure is obliquely applied to the surface of the third substrate 30. In FIGS. 22A to 22C, the reference symbol G denotes a gravity center of the elastic projection 32. In FIGS. 21A to 21C and 22A to 22C, like reference numerals denote like elements as in FIGS. 7A to 7C and 8A to 8C, and description thereof will be omitted. In addition, a distance between the first and second capacitor electrodes 212 and 222 is constantly retained during a process of applying the external pressure.

As shown in FIGS. 21A and 22A, before the external pressure is applied to the surface of the third substrate 30, the elastic projection 32 is not deformed. At this moment, the gravity center G of the elastic projection 32 is arranged in a location overlapping with the reference point P. In addition, the tip of the elastic projection 32 overlaps with the second capacitor electrode 222. Specifically, the tip of the elastic projection 32 has a circular shape as seen in a plan view while it overlaps with the second capacitor electrode 222. In addition, the strength or the direction of the external pressure is obtained based on the electrostatic capacitance value detected from the capacitance detection element at this moment.

As shown in FIGS. 21B and 22B, when the external pressure is applied to the surface of the third substrate 30 in a vertical direction, the elastic projection 32 is compressively deformed in the Z direction while a tip thereof abuts on the surface of the second substrate 120. As a result, the second substrate 120 is bent in the −Z direction, and the distance between the first and second substrates 210 and 120 (the thickness of the dielectric body 40) is reduced in comparison with a case where no external pressure is applied. That is, the electrostatic capacitance value of the capacitance detection element at this moment increases in comparison with a case where no external pressure is applied. In addition, the tip of the elastic projection 32 has a circular shape as seen in a plan view and a larger size in comparison with a case where no external pressure is applied.

As shown in FIGS. 21C and 22C, when the external pressure is obliquely applied to the surface of the third substrate 30, the elastic projection 32 is compressively deformed with an inclination while a tip thereof abuts on the surface of the second substrate 120. As a result, the second substrate 120 is bent in the −Z direction, and the distance between the first and second substrates 210 and 120 (the thickness of the dielectric body 40) is reduced in comparison with a case where no external pressure is applied. In addition, the +X direction component of the bending amount of the second substrate 120 is larger than −X direction component thereof. At this moment, the gravity center G of the elastic projection 32 is deviated from the reference point P to the +X and +Y directions. It is possible to calculate the in-plane direction components (Fx and Fy described above) of the external pressure based on the difference (displacement amount) of the gravity center G of the elastic projection 32. In addition, the tip of the elastic projection 32 has a elliptical shape as seen in a plan view. Specifically, comparing the area overlapping between the tip of the elastic projection 32 and a plurality of first capacitor electrodes 212, the overlapping ratio of a portion arranged in +X and +Y directions is larger than that of a portion arranged in the −X and −Y directions.

Figure 23:
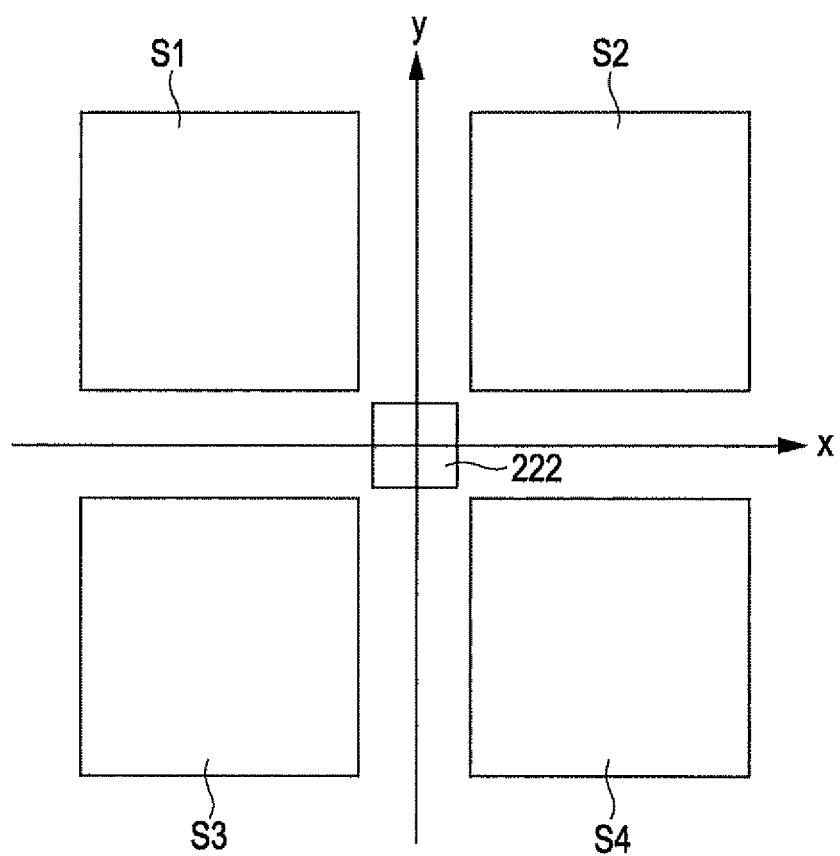
FIG. 23 is a diagram illustrating a coordinate system for a sensing area according to a fifth embodiment.

FIG. 23 is a diagram illustrating a coordinate system of a sensing area according to a fifth embodiment in conjunction with FIG. 9. As shown in FIG. 23, as a plurality of capacitance detection elements, a total of four capacitance detection elements S1, S2, S3, and S4 are arranged in two rows and two columns in each unit detection area S.

Here, if the electrostatic capacitance value (detection values) detected from each capacitance detection element S1, S2, S3, and S4 are denoted by $P_{S1}$, $P_{S2}$, $P_{S3}$, and $P_{S4}$, respectively, the x direction component Fx of the external force (a ratio of the force component applied in the X direction out of the in-plane direction components of the external force) can be expressed as equation (2) described above.

In addition, the Y direction component Fy of the external force (a ratio of the force component applied in the Y direction out of the in-plane direction components of the external force) can be expressed as equation (3) described above.

In addition, the Z direction component Fz of the external force (the vertical direction component of the external force) can be expressed as equation (4) described above.

Similar to the first embodiment, in the present embodiment, differences of the electrostatic capacitance value of each capacitance detection element obtained by arbitrarily combining the electrostatic capacitance values of the four capacitance detection elements S1, S2, S3, and S4, that change depending on the elastic deformation of the elastic projection caused by an external pressure, are calculated, and the strength and the direction of the external pressure are calculated based on the differences.

As shown in equation (2), for the X direction component Fx of the external pressure, the capacitance detection elements S2 and S4 arranged in the +X direction are combined, and the capacitance detection elements S1 and S3 arranged in the −X direction are combined out of the electrostatic capacitance values of the four capacitance detection elements S1, S2, S3, and S4. In this manner, the X direction component of the external pressure is obtained based on a difference between the electrostatic capacitance value obtained by combining the capacitance detection elements S2 and S4 arranged in the +X direction and the electrostatic capacitance value obtained by combining the capacitance detection elements S1 and S3 arranged in the −X direction.

As shown in equation (3), for the Y direction component Fy of the external pressure, the capacitance detection elements S1 and S2 arranged in the +Y direction are combined, and the capacitance detection elements S3 and S4 arranged in the −Y direction are combined out of the electrostatic capacitance values of the four capacitance detection elements S1, S2, S3, and S4. In this manner, the Y direction component of the external pressure is obtained based on a difference between the electrostatic capacitance value obtained by combining the capacitance detection elements S1 and S2 arranged in the +Y direction and the electrostatic capacitance value obtained by combining the capacitance detection elements S3 and S4 arranged in the −Y direction.

As shown in equation (4), for the Z direction component Fz of the external pressure, a resultant force is obtained by adding the electrostatic capacitance values of the four capacitance detection elements S1, S2, S3, and S4. In order to match the detection value of the Z direction component Fz of the external pressure with the X direction and Y direction components Fx and Fy of the external pressure, it is necessary to properly correct the detection value using a correction coefficient determined based on a shape or a material of the elastic projection 32.

In the detection device 5 according to the present embodiment, since the first and second capacitor electrodes 212 and 222 are arranged in the first substrate 210, it is possible to form the first and second capacitor electrodes 212 and 222 through the same process. Therefore, it is possible to simplify the manufacturing process and facilitate improved manufacturing efficiency and reduced manufacturing cost. In addition, since it is possible to suppress warping or the like in the second substrate 120 through the heating process of the manufacturing process, it is possible to improve a detection precision of the external pressure. In addition, since the distance between electrodes can be constantly retained in the course of the deformation of the elastic projection 32, it is possible to detect the strength and the direction of the external pressure with a high precision.

Electronic Device

Figure 24:
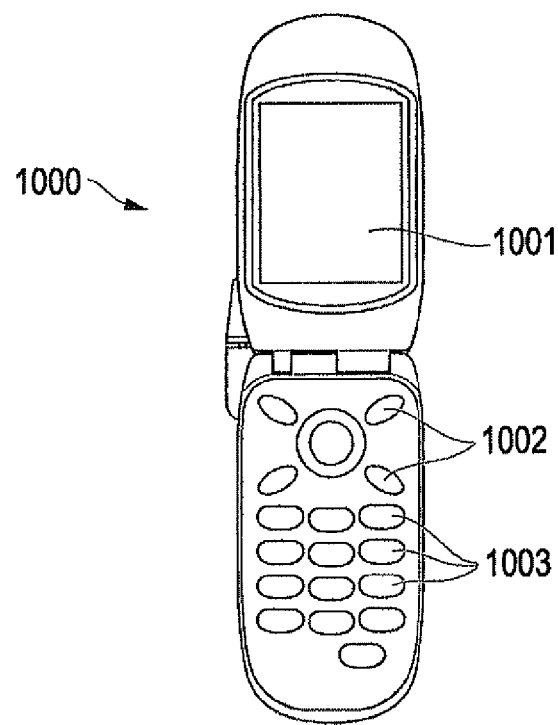
FIG. 24 is a schematic diagram illustrating a schematic configuration of a mobile phone as an example of the electronic device.

FIG. 24 is a schematic diagram illustrating a schematic configuration of a mobile phone 1000 obtained by applying the detection devices 1 to 5 according to the aforementioned embodiments. The mobile phone 1000 includes a plurality of manipulation buttons 1003, a scroll button 1002, and liquid crystal panel 1001 having the detection device as a display unit. By manipulating the scroll button 1002, the screen displayed on the liquid crystal panel 1001 is scrolled. A menu button (not shown) is displayed on the liquid crystal panel 1001. For example, when the menu button is touched by a finger, yellow pages may be displayed, or a telephone number of the mobile phone may be displayed.

Figure 25:
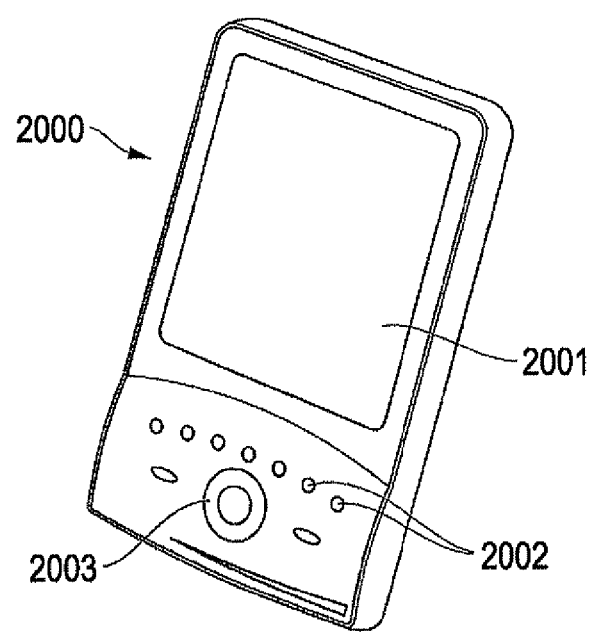
FIG. 25 is a schematic diagram illustrating a schematic configuration of a mobile information terminal as an example of the electronic device.

FIG. 25 is a schematic diagram illustrating a schematic configuration of the mobile information terminal (PDA: Personal Digital Assistants) 2000 obtained by applying the detection devices 1 to 5 according to the aforementioned embodiments. The mobile information terminal 2000 includes a plurality of manipulation buttons 2002, a power switch 2003, and a liquid crystal panel 2001 having the detection device as a display unit. When the power switch 2003 is manipulated, a menu button is displayed on the liquid crystal panel 2001. For example, when the menu button (not shown) is touched by a finger, yellow pages may be displayed, or a schedule book may be displayed.

In such an electronic device, since the aforementioned detection device is provided, it is possible to provide an electronic device capable of detecting the strength and the direction of the external pressure with a high precision.

In addition, the electronic device may include, for example, a personal calculator, a monitor of a video camera, a car navigation device, a pager, an electronic note, an electronic calculator, a word processor, a workstation, a visual phone, a POS terminal, a digital camera, a device provided with a touch panel, and the like. For such an electric equipment, it is possible to apply the detection device according to the invention.

Robot

Figure 26A:
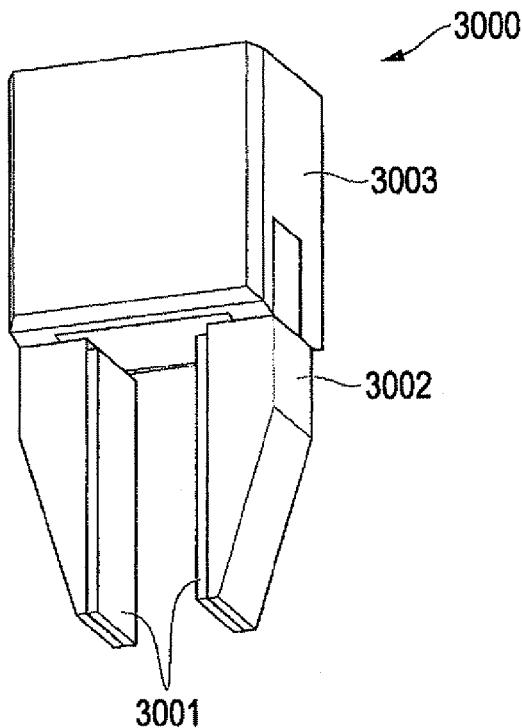
FIG. 26 is a schematic diagram illustrating a schematic configuration of a robotic hand as an example of the robot.
Figure 26B:
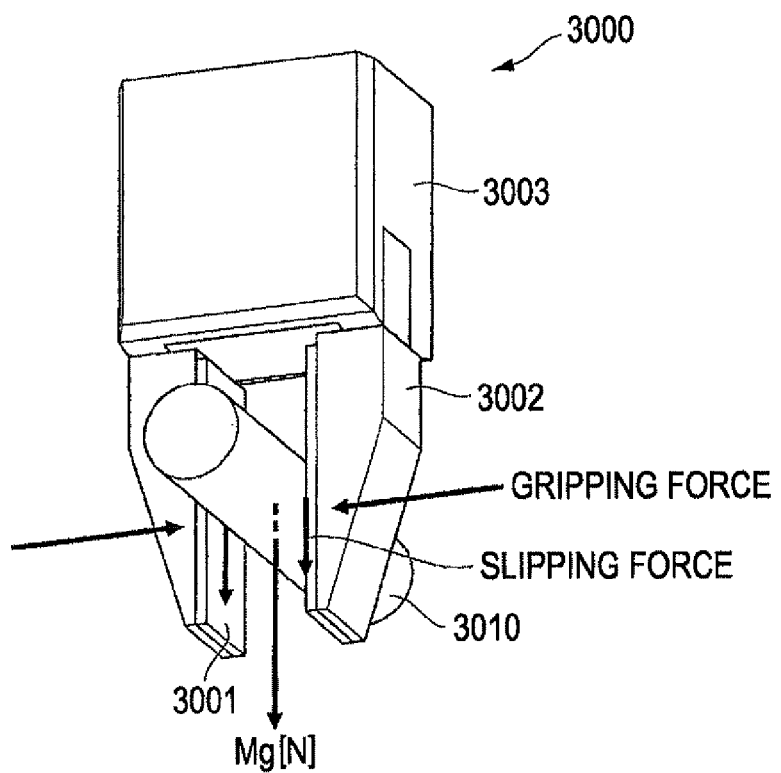

FIGS. 26A and 26B are schematic diagrams illustrating a schematic configuration of a robotic hand 3000 obtained by applying the detection devices 1 to 5 according to the aforementioned embodiments. As shown in FIG. 26A, the robotic hand 3000 includes a mainframe section 3003, a pair of arms 3002, and a gripping section 3001 obtained by applying the detection device. For example, when a driving signal is transmitted to the arm 3002 using a control device such as a remote controller, a pair of arms 3002 are opened or closed.

As shown in FIG. 26B, a case where a target object 3010 such as a cup is gripped by a robotic hand 3000 will be discussed. In this case, a force applied to the target object 3010 is detected as a pressure in the gripping section 3001. The robotic hand 3000 includes the aforementioned detection device as the gripping section 3001, it can detect a force in a direction perpendicular to the surface (contact surface) of the target object 3010 and a force in the slipping direction with a gravity Mg (a slipping force component). For example, it is possible to grip the target object 3010 with an increased or decreased force depending on a tactile feeling of the target object 3010 without deforming a flexible object or missing an object susceptible to slipping.

Since such a robot has the aforementioned detection device, it is possible to provide a robot capable of detecting the strength and the direction of the external pressure with a high precision.

The entire disclosure of Japanese Patent Application No. 2010-166792, filed Jul. 26, 2010 and Japanese Patent Application No. 2011-143837, filed Jun. 29, 2011 are expressly incorporated by reference herein.

What is claimed is:

1. A detection device that detects an intensity and a direction of an external force applied to a first substrate, a second substrate and a third substrate, the detection device comprising:

the first substrate that includes a plurality of first capacitor electrodes disposed on a surface of the first substrate;

the second substrate disposed to face the first substrate, the plurality of first capacitor electrodes being disposed between the first substrate and the second substrate;

a second capacitor electrode disposed to face the surface of the first substrate on which the plurality of first capacitor electrodes are disposed, the second capacitor electrode being disposed on the second substrate;

a dielectric body disposed between the first substrate and the second substrate, the dielectric body being formed of an elastic body or fluid; and a third substrate having an elastic projection at one end portion, the elastic projection defining a tip, the tip of the elastic projection contacting the second substrate when the second substrate is elastically deformed by external pressure, and the tip of the elastic projection protruding away from the third substrate.

2. The detection device according to claim 1, further comprising:

a plurality of capacitance detection elements defined by the plurality of first capacitor electrodes, the second capacitor electrode and the dielectric body; and a calculate device configured to calculate the intensity and the direction of the external force based on differences in electrostatic capacitance values of each of the plurality of capacitance detection elements obtained by arbitrarily combining electrostatic capacitance values of the plurality of capacitance detection elements, the plurality of electrostatic capacitance values changing based on an amount of elastic deformation of the elastic projection caused by the external force.

3. The detection device according to claim 2, each of the plurality of capacitance detection elements detecting a change of the electrostatic capacitance value caused by elastic deformation of the elastic projection and a change of the electrostatic capacitance value caused by deformation of the dielectric body, the change of the electrostatic capacitance value caused by the elastic deformation of the elastic projection capable of being distinguished from the change of the electrostatic capacitance value caused by the deformation of the dielectric body.

4. The detection device according to claim 1, the plurality of first capacitor electrodes being point-symmetrically disposed on the surface of the first substrate.

5. The detection device according to claim 4, the plurality of first capacitor electrodes being arranged in a matrix along a first direction and a second direction, the second direction being perpendicular to the first direction.

6. The detection apparatus according to claim 5, the second capacitive electrode being disposed on the second substrate.

7. The detection device according to claim 6, the plurality of first capacitor electrodes being arranged in at least four rows in the first direction and four columns in the second direction.

8. The detection device according to claim 1, the third substrate further including a plurality of elastic projections, each of the plurality of elastic projections being spaced apart from each other.

9. The detection device according to claim 8, further comprising:

a spacer disposed between the first substrate and the second substrate, the spacer maintaining a distance between the first substrate and the second substrate, the spacer being disposed at least adjacent to an outer perimeter of one of the plurality of elastic projections.

10. The detection device according to claim 8, further comprising:
   a reinforcing member disposed on a surface of the third substrate opposite to the plurality of elastic projections, the reinforcing member having a stiffness greater than a stiffness of the third substrate.

11. An electronic device comprising the detection device according to claim 1.

12. A robot comprising the detection device according to claim 1.

* * * * *